(12) United States Patent
Park et al.

(10) Patent No.: US 10,321,118 B2
(45) Date of Patent: Jun. 11, 2019

(54) 3D DISPLAY DEVICE AND METHOD

(75) Inventors: Sang-moo Park, Yongin-si (KR);
Ki-hyung Kang, Suwon-si (KR);
Jung-hoon Yoon, Suwon-si (KR);
Dong-choon Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 379 days.

(21) Appl. No.: 13/978,487

(22) PCT Filed: Jan. 4, 2012

(86) PCT No.: PCT/KR2012/000081
§ 371 (c)(1),
(2), (4) Date: Jul. 5, 2013

(87) PCT Pub. No.: WO2012/093849
PCT Pub. Date: Jul. 12, 2012

(65) Prior Publication Data
US 2013/0286168 A1    Oct. 31, 2013

Related U.S. Application Data

(60) Provisional application No. 61/429,552, filed on Jan. 4, 2011, provisional application No. 61/499,343, filed
(Continued)

(51) Int. Cl.
*H04N 13/302* (2018.01)
*G09G 3/00* (2006.01)
(Continued)

(52) U.S. Cl.
CPC ........... *H04N 13/302* (2018.05); *G09G 3/003* (2013.01); *H04N 13/139* (2018.05);
(Continued)

(58) Field of Classification Search
CPC ........... H04N 13/0029; H04N 13/0402; H04N 13/0413
(Continued)

(56) References Cited

U.S. PATENT DOCUMENTS 6,049,424 A * 4/2000 Hamagishi ......... G02B 27/2214
345/419
6,532,591 B1   3/2003 Arai et al.
(Continued)

FOREIGN PATENT DOCUMENTS

CN    1892808 A    1/2007
CN    1922893 A    2/2007
(Continued)

OTHER PUBLICATIONS

CN 201281790 English Translation, Jul. 2009, Wen et al.*
(Continued)

*Primary Examiner* — Jamie J Atala
*Assistant Examiner* — Kathleen V Nguyen
(74) *Attorney, Agent, or Firm* — Sughrue Mion, PLLC

(57) ABSTRACT

A 3D display device includes: a data processor configured to generate at least one frame by combining a left-eye image and a right-eye image; a panel including pixels, each of the pixels including three sub pixels; a barrier configured to form a light blocking region and a light transmitting region on the panel on a basis of two sub pixel units; and a controller configured to control the data processor to generate the at least one frame by placing the left-eye image and the right-eye image alternately on the basis of two sub pixels, and to control the panel to display at least one frame generated by the data processor.

10 Claims, 35 Drawing Sheets

Related U.S. Application Data on Jun. 21, 2011, provisional application No. 61/532,326, filed on Sep. 8, 2011.

(51) Int. Cl.
*H04N 13/376* (2018.01)
*H04N 13/324* (2018.01)
*H04N 13/315* (2018.01)
*H04N 13/139* (2018.01)
*H04N 13/398* (2018.01)

(52) U.S. Cl.
CPC ......... *H04N 13/315* (2018.05); *H04N 13/324* (2018.05); *H04N 13/376* (2018.05); *H04N 13/398* (2018.05)

(58) Field of Classification Search
USPC .......................................................... 348/54
See application file for complete search history.

(56) References Cited

U.S. PATENT DOCUMENTS

| | | | |
|---|---|---|---|
| 6,970,290 B1* | 11/2005 | Mashitani | H04N 13/0409 348/54 |
| 7,483,209 B2 | 1/2009 | Nam et al. | |
| 7,719,552 B2 | 5/2010 | Karman | |
| 8,040,371 B2 | 10/2011 | Kim et al. | |
| 8,130,272 B2 | 3/2012 | Pastoor et al. | |
| 8,284,335 B2 | 10/2012 | Kim et al. | |
| 8,687,273 B2 | 4/2014 | Fukushima et al. | |
| 8,917,314 B2 | 12/2014 | Yun et al. | |
| 9,075,240 B2 | 7/2015 | Hong | |
| 2001/0020992 A1* | 9/2001 | Takeda | G02F 1/1393 349/130 |
| 2004/0165136 A1* | 8/2004 | Sugiyama | G02F 1/133707 349/143 |
| 2007/0008314 A1* | 1/2007 | Song | H04N 13/0048 345/419 |
| 2007/0019291 A1 | 1/2007 | Nam et al. | |
| 2007/0103547 A1 | 5/2007 | Kim et al. | |
| 2008/0079804 A1 | 4/2008 | Hamagishi et al. | |
| 2008/0150936 A1 | 6/2008 | Karman | |
| 2009/0141122 A1* | 6/2009 | Hong | G02B 27/2214 348/54 |
| 2009/0225243 A1 | 9/2009 | Kim et al. | |
| 2009/0278936 A1 | 11/2009 | Pastoor et al. | |
| 2009/0282429 A1 | 11/2009 | Olsson et al. | |
| 2010/0100923 A1 | 4/2010 | Toiyama | |
| 2010/0141738 A1 | 6/2010 | Lee et al. | |
| 2010/0149317 A1* | 6/2010 | Matthews | G02B 27/225 348/51 |
| 2010/0182291 A1* | 7/2010 | Kim | H04N 13/0413 345/205 |
| 2010/0182686 A1 | 7/2010 | Fukushima et al. | |
| 2010/0201694 A1 | 8/2010 | Lee et al. | |
| 2011/0122235 A1* | 5/2011 | Lee | H04N 13/0452 348/51 |
| 2011/0254920 A1 | 10/2011 | Yun et al. | |
| 2011/0261158 A1 | 10/2011 | Suh et al. | |
| 2012/0092443 A1 | 4/2012 | Mauchly | |
| 2013/0034182 A1 | 2/2013 | Lee et al. | |

FOREIGN PATENT DOCUMENTS

| | | | |
|---|---|---|---|
| CN | 101154329 A | | 4/2008 |
| CN | 101452118 A | | 6/2009 |
| CN | 201281790 | * | 7/2009 |
| CN | 201281790 Y | | 7/2009 |
| CN | 101512415 A | | 8/2009 |
| EP | 2288170 A2 | | 2/2011 |
| JP | 9149419 A | | 6/1997 |
| JP | 9-197344 A | | 7/1997 |
| JP | 2000197075 A | | 7/2000 |
| JP | 2002-142233 A | | 5/2002 |
| JP | 2004-235734 A | | 8/2004 |
| JP | 2004-266497 A | | 9/2004 |
| JP | 2007-128027 A | | 5/2007 |
| JP | 2007240656 A | | 9/2007 |
| JP | 2008-60761 A | | 3/2008 |
| JP | 2009-139947 A | | 6/2009 |
| JP | 2009-217231 A | | 9/2009 |
| KR | 10-0611664 B1 | | 8/2006 |
| KR | 10-2007-0089137 A | | 8/2007 |
| KR | 10-2009-0047149 A | | 5/2009 |
| KR | 10-2009-0058428 A | | 6/2009 |
| KR | 10-2009-0096108 A | | 9/2009 |
| KR | 1020090109929 A | | 10/2009 |
| KR | 1020100049873 A | | 5/2010 |
| WO | 2008038961 A1 | | 4/2008 |
| WO | 2010053246 A2 | | 5/2010 |
| WO | 2010140767 A2 | | 12/2010 |

OTHER PUBLICATIONS

Communication dated Jul. 15, 2015 issued by United States Patent and Trademark Office in counterpart U.S. Appl. No. 13/980,679.
Communication dated Sep. 1, 2015 issued by The State Intellectual Property Office in P.R. China in counterpart Application No. 201280004671.4.
Communication dated Sep. 28, 2015 issued by The State Intellectual Property Office of the P.R. of China in counterpart Chinese Application No. 201280006001.6.
Communication dated Jan. 5, 2015, issued by the European Patent Office in counterpart European Application No. 12737016.1.
Communication dated Feb. 9, 2015, issued by the State Intellectual Property Office of P.R. China in counterpart Chinese Application No. 201280006001.6.
Akar G B et al., "Transport Methods in 3DTV-A Survey", IEEE Transactions on Circuits and Systems for Video Technology, IEEE Service Center, Piscataway, NJ, US, vol. 17, No. 11, Nov. 1, 2007, pp. 1622-1630, XP011195152.
Tekalp A M et al., "3DTV over IP", IEEE Signal Processing Magazine, IEEE Service Center, Piscataway, NJ, US, vol. 24, No. 6, Nov. 1, 2007, pp. 77-87, XP011197676.
Communication dated Mar. 10, 2015 by The State Intellectual Property Office of PR China in related Application No. 201280004671.4.
International Search Report (PCT/ISA/210) dated Sep. 27, 2012, issued in International Application No. PCT/KR2012/000081.
Matsumura, K., et al., "Outline and Technology of Hybridcast", NHK giken R&D, Nov. 15, 2010, No. 124, pp. 10-17, Japan.
Communication dated Oct. 27, 2015, issued by the Japanese Patent Office in counterpart Japanese Patent Application No. 2013-550392.
Communication dated Feb. 16, 2016, from the State Intellectual Property Office of People's Republic of China in counterpart Application No. 201280004671.4.
Communication dated Mar. 7, 2016, from the State Intellectual Property Office of People's Republic of China in counterpart Application No. 201280006001.6.
Communication dated Feb. 2, 2016, from the Japanese Patent Office in counterpart application No. 2013-547367.
Communication from United States Patent and Trademark Office dated Jan. 29, 2016, in counterpart U.S. Appl. No. 13/980,679.
Communication dated May 25, 2016, issued by the United States Patent and Trademark Office in counterpart U.S. Appl. No. 13/980,679.
Communication dated Nov. 10, 2016, issued by the United States Patent and Trademark Office in counterpart U.S. Appl. No. 13/980,679.
Communication dated Nov. 18, 2016, issued by the European Patent Office in counterpart European Application No. 12731893.9.
Communication dated Dec. 19, 2017, issued by the Korean Intellectual Property Office in corresponding Korean Application No. 10-2011-0128644.
Communication dated Mar. 13, 2018 issued by the Korean Intellectual Property Office in counterpart Korean Patent Application No. 10-2012-0001233.

(56) References Cited

OTHER PUBLICATIONS

Communication dated Sep. 5, 2018, issued by the Korean Patent Office in counterpart Korean Application No. 10-2012-0001233.

* cited by examiner

RELATED ART

[Barrier & Pixel matching]

[Barrier Left shift]

[Barrier Right shift]

FIG. 19

| Left eye | Right eye | Odd Frame | Even Frame |
|---|---|---|---|
| ① | ④ | L L L R R R | R R R L L L |
| ② | ⑤ | L L R R R L | R R L L L R |
| ③ | ⑥ | L R R R L L | R L L L R R |
| ④ | ① | R R R L L L | L L L R R R |
| ⑤ | ② | R R L L L R | L L R R R L |
| ⑥ | ③ | R L L L R R | L R R R L L |

FIG. 23

| Left eye | Right eye | Odd Frame | Even Frame |
|---|---|---|---|
| ① | ⑤ | L L L L R R R R | R R R R L L L L |
| ② | ⑥ | L L L R R R R L | R R R L L L L R |
| ③ | ⑦ | L L R R R R L L | R R L L L L R R |
| ④ | ⑧ | L R R R R L L L | R L L L L R R R |
| ⑤ | ① | R R R R L L L L | L L L L R R R R |
| ⑥ | ② | R R R L L L L R | L L L R R R R L |
| ⑦ | ③ | R R L L L L R R | L L R R R R L L |
| ⑧ | ④ | R L L L L R R R | L R R R R L L L |

FIG. 32

|  |  | P1 | P2 | P3 | P4 | REMARKS |
|---|---|---|---|---|---|---|
| L1 | BARRIER PART |  |  | ■ | ■ | REFERENCE BARRIER PART |
|  | PANEL | / | / | / | / | LLRR |
| L2 | BARRIER PART | ■ |  |  | ■ | 1/4 Shift |
|  | PANEL | / | / | / | / | LLRR |
| L3 | BARRIER PART |  |  | ■ | ■ | REFERENCE BARRIER PART |
|  | PANEL | / | / | / | / | RLLR |
| L4 | BARRIER PART | ■ |  |  | ■ | 1/4 Shift |
|  | PANEL | / | / | / | / | RLLR |
| L5(R1) | BARRIER PART |  |  | ■ | ■ | REFERENCE BARRIER PART |
|  | PANEL | / | / | / | / | RRLL |
| L6(R2) | BARRIER PART | ■ |  |  | ■ | 1/4 Shift |
|  | PANEL | / | / | / | / | RRLL |
| L7(R3) | BARRIER PART |  |  | ■ | ■ | REFERENCE BARRIER PART |
|  | PANEL | / | / | / | / | LRRL |
| L8(R4) | BARRIER PART | ■ |  |  | ■ | 1/4 Shift |
|  | PANEL | / | / | / | / | LRRL |

3D DISPLAY DEVICE AND METHOD

CROSS-REFERENCE TO RELATED APPLICATIONS

This application is a National Stage of International Application No. PCT/KR2012/000081, filed on Jan. 4, 2012, and claims priority from U.S. Patent Application No. 61/429,552, filed on Jan. 4, 2011, U.S. Patent Application No. 61/499,343, filed on Jun. 21, 2011, and U.S. Patent Application No. 61/532,326, filed on Sep. 8, 2011, the disclosures of which are incorporated herein in their entirety by reference.

BACKGROUND

1. Field

Methods and apparatuses consistent with exemplary embodiments relate to a 3-dimensional (3D) display device and a method thereof, and more particularly, to a 3D display device which uses a barrier to enable a user to view a 3D image without 3D glasses, and a method thereof.

2. Description of the Related Art

With the development of electronic technologies, various kinds of electronic apparatuses have been developed and distributed. Display apparatuses such as televisions (TVs) are representative of home appliances.

In recent years, 3D display devices, which enable a user to view a 3D image, are increasingly being distributed. The 3D display devices may be divided into a glasses type system and a non-glasses type system according to whether the 3D display device uses 3D glasses.

One example of the glasses type system is a display device which employs a shutter glasses method. In the shutter glasses method, the display device outputs a left-eye image and a right-eye image alternately, and a left shutter glass and a right shutter glass of a 3D glasses apparatus worn by a user are opened and closed alternately in association with the output of the display device, thereby making the user feel a sense of depth.

The non-glasses type system may be referred to as an autostereoscopy system. A 3D display device of the non-glasses type method displays a space-shifted multi-view image, and projects light corresponding to images of different points of view onto a left eye and a right eye of a user using a parallax barrier or a lenticular lens, thereby making the user feel a sense of depth.

As described above, the non-glasses type system has the advantage of enabling users to view a 3D image without glasses.

FIG. 1 is a view to explain an operation of a related-art display device which uses a parallax barrier.

Referring to FIG. 1, a barrier 10 is disposed on an upper portion of a display panel 20. The barrier 10 includes a plurality of vertical line patterns. An odd line (a) and an even line (b) are turned on or off by being driven alternately.

The display panel 20 displays a frame in which a left-eye image (L) and a right-eye image (R) are placed alternately in a vertical column direction, and then displays a frame in which a left-eye image (L) and a right-eye image (R) are placed in reverse order of the previous frame.

The barrier 10 switches driving of the odd line and the even line according to the operation of the display panel 20. Accordingly, the left-eye image is continuously input to the left eye and the right-eye image is continuously input to the right eye, such that the user can feel a sense of depth.

However, since such a non-glasses type system provides a multi-view image, crosstalk in which a left-eye image and a right-eye image are mixed may occur.

In particular, when the user changes his or her location, the right-eye image may be projected onto the user's left eye and the left-eye image may be projected onto the user's right eye according to the movement of the user, and thus, a reverse image in which the left-eye image and the right-eye image are reversed may be generated.

Therefore, there is a demand for a method for displaying a 3D image effectively in a non-glasses type system.

SUMMARY

One or more exemplary embodiments provide a 3D display device which provides images corresponding to a user's left eye and right eye positions using a barrier which is placed on a basis of two sub pixels, thereby attenuating crosstalk between a left-eye image and a right-eye image, and a method thereof.

According to an aspect of an exemplary embodiment, there is provided a 3D display device including: a data processor configured to generate at least one frame by combining a left-eye image and a right-eye image; a panel which includes pixels, each pixel comprising three sub pixels; a barrier configured to form a light blocking region and a light transmitting region on the panel on a basis of two sub pixels; and a controller configured to control the data processor to generate the at least one frame by placing the left-eye image and the right-eye image alternately on the basis of two sub pixels, and to control the panel to display the at least one frame generated by the data processor.

The data processor may be configured to disperse sub pixels constituting two continuous pixels in the left-eye image and sub pixels constituting two continuous pixels in the right-eye image to positions of two pixels of a first frame and positions of two pixels of a second frame, thereby generating the first frame and the second frame in which the sub pixels of the left-eye image and the sub pixels of the right-eye image are alternately placed on the basis of two sub pixels. A left-eye image sub pixel position and a right-eye image sub pixel position in the first frame may be opposite to a left-eye image sub pixel position and a right-eye image sub pixel position in the second frame.

The data processor may be configured to place R and G sub pixels of a first pixel of the right-eye image on R and G sub pixels of a first pixel of the first frame, to place a B sub pixel of the first pixel of the right-eye image on a B sub pixel of a first pixel of the second frame, to place an R sub pixel of a second pixel of the right-eye image on an R sub pixel of a second pixel of the second frame, to place G and B sub pixels of the second pixel of the right-eye image on G and B sub pixels of a second pixel of the first frame, to place r and g sub pixels of a first pixel of the left-eye image on r and g sub pixels of the first pixel of the second frame, to place a b sub pixel of the first pixel of the left-eye image on a b sub pixel of the first pixel of the first frame, to place an r sub pixel of a second pixel of the left-eye image on an r sub pixel of the second pixel of the first frame, and to place g and b sub pixels of the second pixel of the left-eye image on g and b sub pixels of the second pixel of the second frame.

The data processor may be configured to generate a first frame having a pattern by distributing sub pixels of two continuous pixels in the right-eye image and sub pixels of two continuous pixels in the left-eye image to four sub pixels, and may be configured to generate a second frame by distributing sub pixels of two continuous pixels in the right-eye image and sub pixels of two continuous pixels in the left-eye image to four sub pixels in a reverse pattern of the pattern of the first frame.

The 3D display device may further include a location tracker which is configured to track a user location.

The controller may be configured to control the data processor to change a combination pattern of the left-eye image and the right-eye image according to the user location which is tracked by the location tracker.

When the user location tracked by the location tracker is within a normal field of view, the data processor may alternately place two left-eye sub pixels of the pixel of the left-eye image and two right-eye sub pixels of the pixel of the right-eye image to correspond to positions of the user's left eye and right eye, respectively, and, when the user location tracked by the location tracker is changed to be outside of the normal field of view, the data processor may shift the two left-eye sub pixels and the two right-eye sub pixels on a basis of one sub pixel according to the changed user location.

Also, the barrier may include: a liquid crystal layer; a plurality of upper electrodes which are disposed on a top surface of the liquid crystal layer and which are configured to have a predetermined gap between each other; and a plurality of lower electrodes which cross with the plurality of upper electrodes by ¼ pitch on a lower surface of the liquid crystal layer. The pitch may be a size that is obtained by adding the predetermined gap and a width of one upper electrode.

The 3D display device may further include a barrier driver configured to drive the upper electrode and the lower electrode individually so that a reference barrier pattern and a ¼ shift pattern are alternately formed according to a movement of the user. The data processor may shift two left-eye sub pixels and two right-eye sub pixels, which are alternately placed, on a basis of one sub pixel in a direction opposite to a direction of the movement of the user every time that the reference barrier pattern is formed.

According to an aspect of another exemplary embodiment, there is provided a 3D display method including: generating at least one frame by combining a left-eye image and a right-eye image; displaying the at least one frame using a panel; and transmitting or blocking light emitted from the panel on a basis of two sub pixels using a barrier The generating the at least one frame may include distributing sub pixels constituting two continuous pixels in the left-eye image and sub pixels constituting two continuous pixels in the right-eye image to positions of two pixels of a first frame and positions of two pixels of a second frame, thereby generating the first frame and the second frame in which the sub pixels of the left-eye image and the sub pixels of the right-eye image are alternately placed on the basis of two sub pixels. A left-eye image sub pixel position and a right-eye image sub pixel position in the first frame may be opposite to a left-eye image sub pixel position and a right-eye image sub pixel position in the second frame.

The generating the at least one frame may include generating a first frame having a pattern by distributing sub pixels of two continuous pixels in the right-eye image and sub pixels of two continuous pixels in the left-eye image to four sub pixels, and generating a second frame by distributing sub pixels of two continuous pixels in the right-eye image and sub pixels of two continuous pixels in the left-eye image to four sub pixels in a reverse pattern of the pattern of the first frame.

The 3D display method may further include: tracking a user location; and changing a combination pattern of the left-eye image and the right-eye image according to the tracked user location.

The changing may include, when the user location tracked by the tracking is within a normal field of view, alternately placing two left-eye sub pixels of the pixel of the left-eye image and two right-eye sub pixel of the pixel of the right-eye image to correspond to positions of the user's left eye and right eye, respectively, and, when the user location tracked by the location tracker is changed, shifting the two left-eye sub pixels and the two right-eye sub pixels on a basis of one sub pixel according to the changed user location.

The barrier part may include: a liquid crystal layer; a plurality of upper electrodes which are disposed on a top surface of the liquid crystal layer and which are configured to have a predetermined gap between each other; and a plurality of lower electrodes which cross with the plurality of upper electrodes by ¼ pitch on a lower surface of the liquid crystal layer. The pitch may be a size that is obtained by adding the predetermined gap and a width of one upper electrode. The transmitting or blocking the light emitted from the panel on the basis of two sub pixels may include driving the plurality of upper electrodes and the plurality of lower electrode individually so that a light transmitting region and a light blocking region are alternately formed on the barrier.

The 3D display method may further include driving the plurality of upper electrodes and the plurality of lower electrodes individually so that a reference barrier pattern and a ¼ shift pattern are alternately formed according to a movement of the user. The generating the at least one frame may include shifting two left-eye sub pixels and two right-eye sub pixels, which are alternately placed, on a basis of one sub pixel in a direction opposite to a direction of the movement of the user every time that the reference barrier pattern is formed.

According to various exemplary embodiments described above, crosstalk in which a left-eye image and a right-eye image are mixed can be reduced even if a user's location is changed.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and/or other aspects of the present disclosure will become more readily appreciated from the following description of the exemplary embodiments, taken in conjunction with the accompanying drawings of which:

FIG. 19 is a view to explain the method for configuring the frame of FIG. 18 in detail;

FIG. 23 is a view to explain the method for configuring the frame of FIG. 22 in detail;

FIG. 32 is a view to explain a frame change and a barrier driving state in each process of FIGS. 27, 28, 29, 30 and 31;

DETAILED DESCRIPTION

Figure 1:
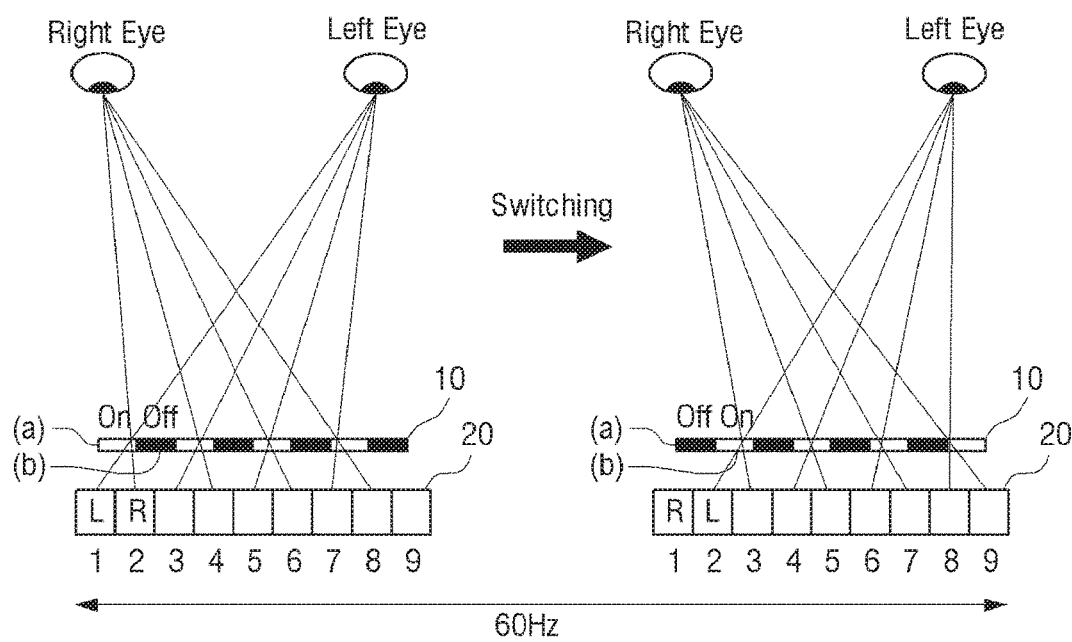
FIG. 1 is a view to explain an operation of a related-art non-glasses type system.

Reference will now be made in detail to the present exemplary embodiments, examples of which are illustrated in the accompanying drawings, wherein like reference numerals refer to the like elements throughout. The exemplary embodiments are described below in order to explain the present disclosure by referring to the figures.

Figure 2:
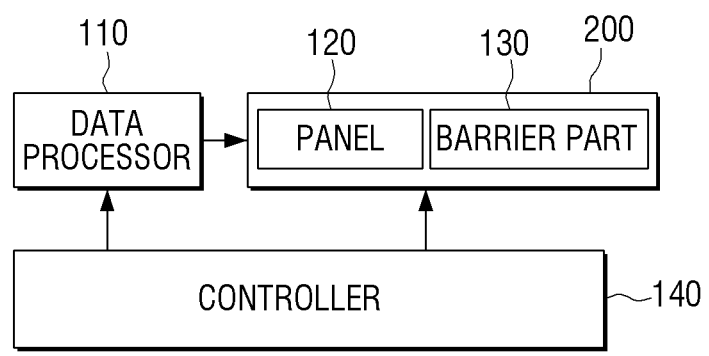
FIG. 2 is a block diagram illustrating a configuration of a 3D display device according to an exemplary embodiment.

FIG. 2 is a block diagram illustrating a configuration of a 3D display device according to an exemplary embodiment. The 3D display device refers to a device that displays content using a 3D method and makes a user feel a sense of depth. The 3D display device may be implemented by various kinds of devices such as a television (TV), a monitor, a personal computer (PC), a mobile phone, a laptop computer, a tablet PC, an electronic album, an electronic book, and a personal digital assistant (PDA).

Referring to FIG. 1, the 3D display device includes a data processor 110, a panel 120, a barrier part 130, and a controller 140. The panel 120 and the barrier part 130 constitute a display 200.

The data processor 110 generates a multi-view image. The multi-view image refers to a combination of images that are photographed for the same subject at different angles. The data processor 110 may configure a single image frame by placing a left-eye image and a right-eye image alternately. Also, the data processor 110 may configure a frame by combining four or more images. The left-eye image and the right-eye image, which are a base of the multi-view image, may be provided from an external source such as a broadcasting station or a web server, or may be provided from an internal or external storage medium or a reproducing apparatus.

The data processor 110 may generate only one frame or may generate two frames according to various exemplary embodiments. That is, in an exemplary embodiment in which a single frame is generated by combining a left-eye image and a right-eye image, a user views only half of the data of each of the left-eye image and the right-eye image, and thus, resolution deteriorates. Accordingly, the resolution may be maintained by generating two frames. If only a single frame is generated, an output frequency of an original image is used as it is, and, if two frames are used, the output frequency doubles. For example, a single frame is displayed at 60 Hz, and two frames are displayed at 120 Hz.

The panel 120 displays the frame which is generated by the data processor 110. The panel 120 includes a plurality of pixels. Each pixel is comprised of three sub pixels, such as R (red), G (green), and B (blue) pixels.

The barrier part 130 selectively transmits or blocks light of the frame displayed on the panel 120 so that images of different points of view may enter the user's left eye and right eye. Accordingly, the user can feel a sense of depth. Specifically, the barrier part 130 may be placed on the panel 120 on a basis of two sub pixels. The barrier part 130 may be implemented by using a parallax barrier.

The controller 140 controls the data processor 110 to generate at least one frame by placing the left-eye image and the right-eye image alternately on a basis of two sub pixels. The controller 140 controls the panel 120 to display the at least one frame generated by the data processor 110. Also, the controller 140 drives the barrier part 130 to reverse a light transmitting region and a light blocking region on each frame alternately. The light transmitting region is a region through which light emitted from the panel 120 is transmitted to a viewer, and the light blocking region is a region through which the light is not transmitted to the viewer and is blocked. The barrier part 130 divides a screen into a plurality of vertical lines, and opens or closes an even line and an odd line alternately. The opened line corresponds to the light transmitting region and the closed line corresponds to the light blocking region.

The barrier part 130 may include a liquid crystal layer, an upper electrode, and a lower electrode. The upper electrode and the lower electrode may be implemented by using an indium tin oxide (ITO) transparent electrode so that the upper electrode and the lower electrode do not block light by themselves.

At least one of the upper electrode and the lower electrode may be implemented as a plurality of electrodes. For example, when a plurality of upper electrodes is provided, the plurality of upper electrodes may be disposed to be spaced apart from one another by a predetermined gap on a top surface of the liquid crystal layer. On the other hand, the lower electrode may be implemented as a common electrode.

Alternatively, the lower electrode may be implemented as a plurality of lower electrodes and the upper electrode may be implemented as a common electrode. Also, a plurality of upper electrodes and a plurality of lower electrodes may be provided. The case in which a plurality of upper electrodes and a plurality of lower electrodes are provided will be explained in detail below.

The controller 140 drives the plurality of electrodes individually so that the light transmitting region and the light blocking region have a size of a unit of two sub pixels and are alternately repeated. The controller 140 drives the barrier part 130 by applying a driving signal to each of the upper electrode and the lower electrode or earthing each of the upper and lower electrodes. An electric potential difference is formed between the electrode to which the driving signal is applied and the electrode which is earthed, and the liquid crystal layer between the electrodes is turned on and forms the light transmitting region. The liquid crystal layer that has no electric potential difference is turned off and forms the light blocking region.

As described above, the frame may be generated by combining the left-eye image and the right-eye image on the basis of two sub pixels, and the barrier part 130 may transmit or block the light on the basis of two sub pixels.

As a result, the light transmitting region is larger than one sub pixel. Accordingly, a viewing distance can be reduced in comparison with a method that transmits or blocks light on a basis of single sub pixels.

Also, when the user changes his or her location, the region blocked by the barrier part 130 is not limited to a specific color. Accordingly, a color shift phenomenon can be prevented in comparison with a method that transmits or blocks light on a basis of pixels.

That is, when the user views an image within a normal field of view, the left-eye image and the right-eye image are separated from each other by the barrier part 130 and are recognized by the user's left eye and right eye, respectively. When the user moves to the right or left, the light transmitting region of the barrier part 130 shifts in the opposite direction. If the light transmitting region of the barrier part 130 is shifted on a basis of three sub pixels, the light emitted from the R or B pixel that is located at an edge from among the sub pixels is blocked by the barrier part 130, and thus a color component of the sub pixel is reduced. Accordingly, a color shift phenomenon occurs.

Figure 3:
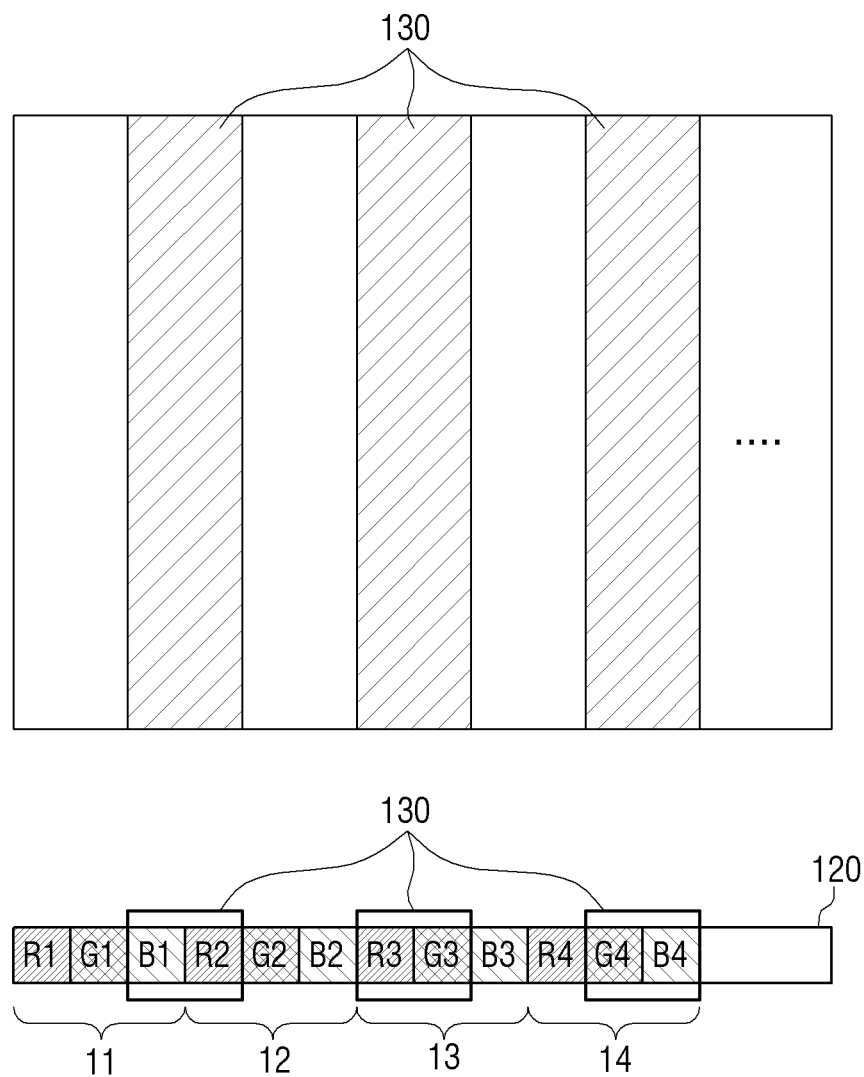
FIG. 3 is a view illustrating a barrier which is configured on a basis of two sub pixels and a frame in which a left-eye image and a right-eye image are placed on a basis of two sub pixels according to an exemplary embodiment.

However, if the light transmitting region and the light blocking region are formed on the basis of two sub pixels as shown in FIG. 3, the R, G, and B sub pixels are reduced at the same ratio in view of a unit of two pixels even if an area of one of the two sub pixels is reduced. Accordingly, a color shift phenomenon does not occur.

FIG. 3 illustrates an example of the barrier part 130 which transmits or blocks light on a basis of two sub pixels according to an exemplary embodiment. Referring to FIG. 3, the panel 120 includes a plurality of pixels 11, 12, 13, 14, . . . , and each pixel includes three R, G, and B sub pixels. The barrier part 130 blocks B1 sub pixel of the first pixel 11 and R2 sub pixel of the second pixel 12, and blocks R3 and G3 sub pixels of the third pixel 13 and G4 and B4 sub pixels of the fourth pixel. In the next frame, the barrier part 130 switches between positions of the light transmitting region and the light blocking region so that the light of the sub pixels that have been blocked before is transmitted.

Figure 4:
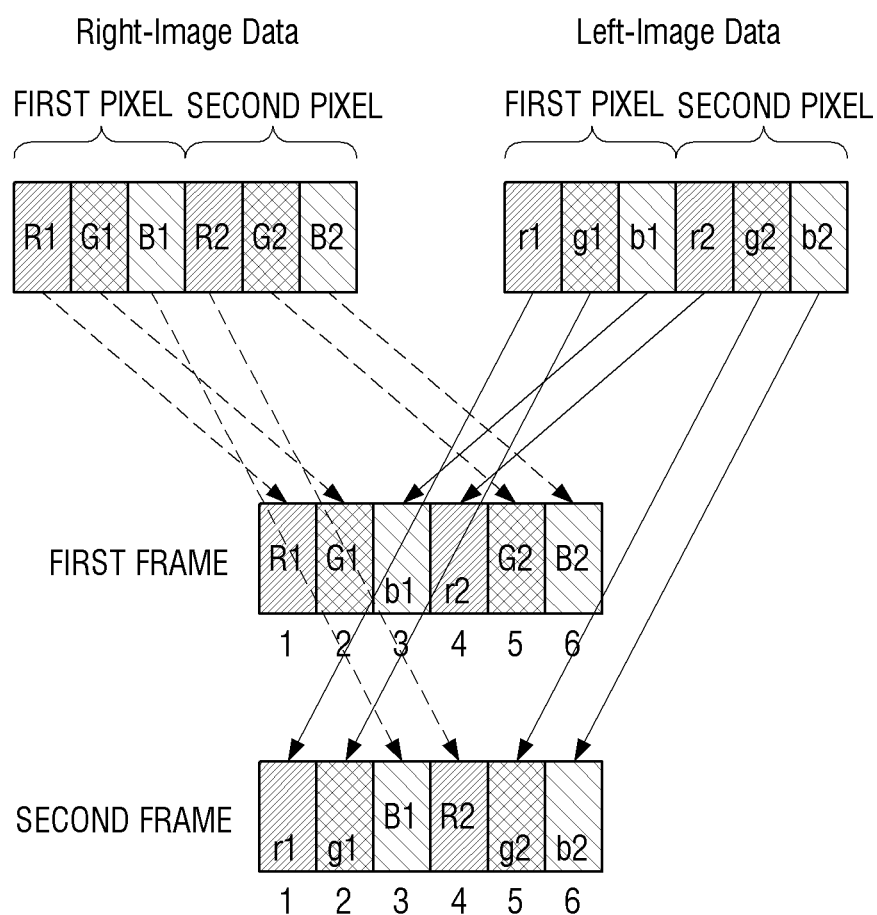
FIG. 4 is a view illustrating an example of a method for configuring a frame using a left-eye image and a right-eye image according to an exemplary embodiment.

FIG. 4 illustrates an example of a method for generating a plurality of frames using a left-eye image and a right-eye image according to an exemplary embodiment.

The data processor 110 distributes sub pixels of two continuous pixels of a left-eye image and sub pixels of two continuous pixels of a right-eye image to positions of two pixels of a first frame and two pixels of a second frame. Accordingly, in the first frame, the sub pixels of the left-eye image and the sub pixels of the right-eye image are alternately placed on a basis of two sub pixels. In contrast, in the second frame, the sub pixels of the right-eye image and the sub pixels of the left-eye image are alternately placed on the basis of two sub pixels.

Referring to FIG. 4, the data processor 110 places R and G sub pixels (R1 and G1) of the first pixel of the right-eye image on R and G sub pixels of the first pixel of the first frame, places a B sub pixel (B1) of the first pixel of the right-eye image on a B sub pixel of the first pixel of the second frame, places an R sub pixel (R2) of the second pixel of the right-eye image on an R sub pixel of the second pixel of the second frame, and places G and B sub pixels (G2 and B2) of the second pixel of the right-eye image on G and B sub pixels of the second pixel of the first frame.

Also, the data processor 110 places r and g sub pixels (r1 and g1) of the first pixel of the left-eye image on r and g sub pixels of the first pixel of the second frame, places a b sub-pixel (b1) of the first pixel of the left-eye image on a b sub pixel of the first pixel of the first frame, places an r sub pixel (r2) of the second pixel of the left-eye image on an r sub-pixel of the second pixel of the first frame, and places g and b sub pixels (g2 and b2) of the second pixel of the left-eye image on g and b sub pixels of the second pixel of the second frame. Since two frames are generated using the left-eye image and the right-eye image as shown in FIG. 4, a reduction in resolution can be compensated.

Figure 5:
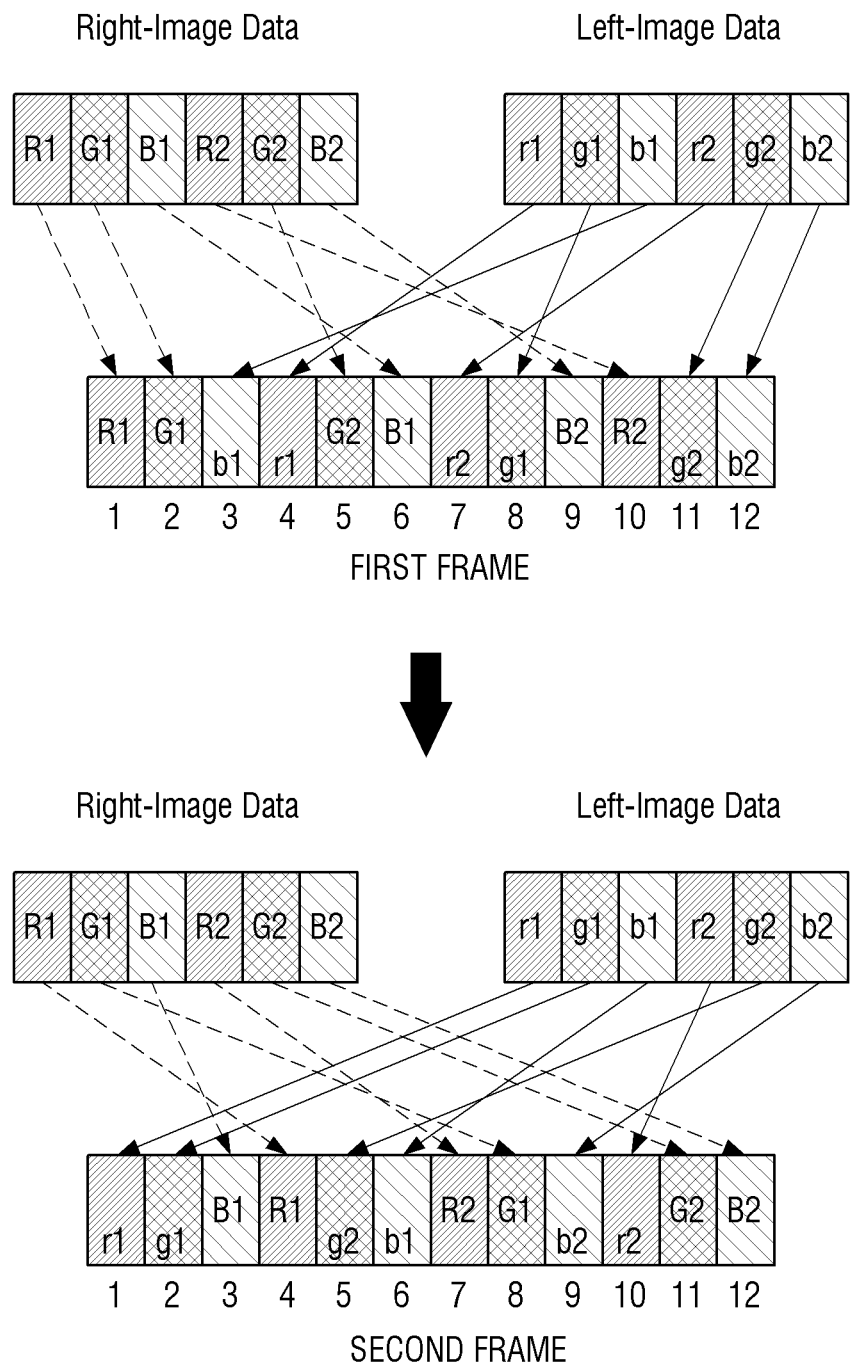
FIG. 5 is a view illustrating another example of a method for configuring a frame using a left-eye image and a right-eye image according to an exemplary embodiment.

FIG. 5 illustrates a method for generating a frame according to another exemplary embodiment. Referring to FIG. 5, the data processor 110 generates a first frame by distributing sub pixels of two continuous pixels of a right-eye image and sub pixels of two continuous pixels of a left-eye image to four pixels. The data processor 110 generates a second frame by distributing the sub pixels of the two continuous pixels of the right-eye image and the sub pixels of the two continuous pixels of the left-eye image to four pixels in a pattern opposite to that of the first frame.

Referring to FIG. 5, R1, G1, and B1 sub pixels of the first pixel of the right-eye image and R2, G2, and B2 sub pixels of the second pixel of the right-eye image, and r1, g1, and b1 sub pixels of the first pixel of the left-eye image and r2, g2, and b2 sub pixels of the second pixel of the left-eye image are placed in the first frame in order of R1, G1, b1, r1, G2, B1, r2, g1, B2, R2, g2, and b2. The sub-pixels are placed in the second frame in order of r1, g1, B1, R1, g2, b1, R2, G1, b2, r2, G2, and B2.

Figure 6:
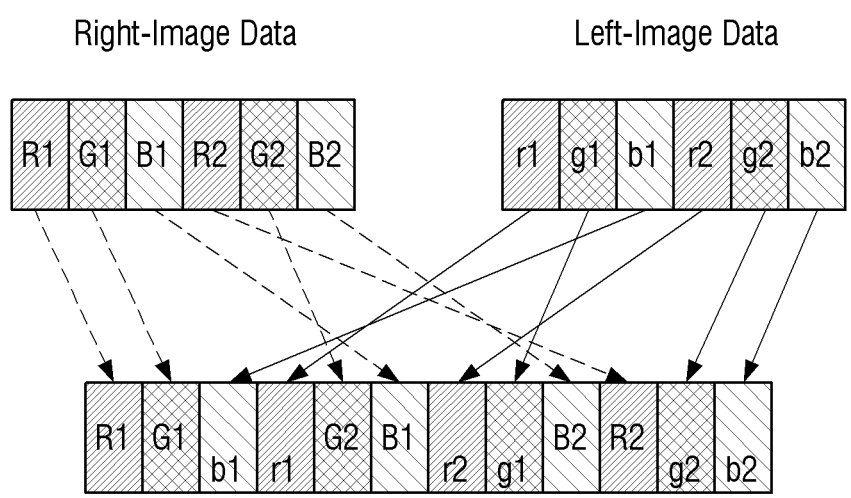
FIG. 6 is a view illustrating still another example of a method for configuring a frame using a left-eye image and a right-eye image according to an exemplary embodiment.

FIG. 6 illustrates a method for generating a frame according to still another exemplary embodiment. Referring to FIG. 6, the data processor 110 generates a single frame by placing R1, G1 and B1 sub pixels of a first pixel of a right-eye image, R2, G2, and B2 sub pixels of a second pixel of the right-eye image, r1, g1, and b1 sub pixels of a first pixel of a left-eye image, and r2, g2, and b2 sub pixels of a second pixel of the left-eye image in order of R1, G1, b1, r1, G2, B1, r2, g1, B2, R2, g2, and b2. Although two frames are generated for the sake of compensating for resolution in FIG. 5, a single frame is generated in FIG. 6.

Figure 7A:
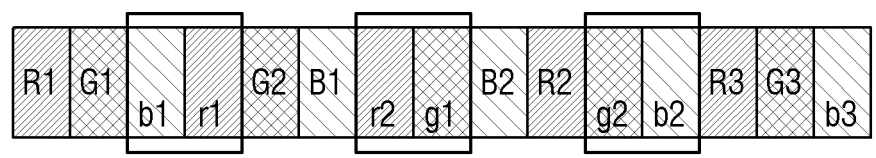
FIGS. 7A-7C are views illustrating a shift phenomenon of a barrier and a pixel according to a user's location according to an exemplary embodiment.
Figure 7B:
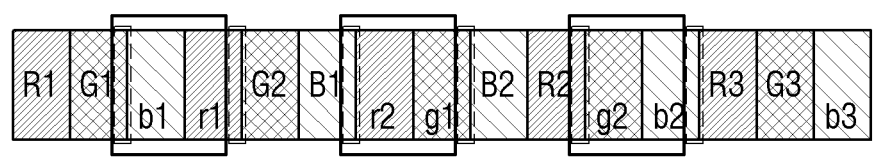
Figure 7C:
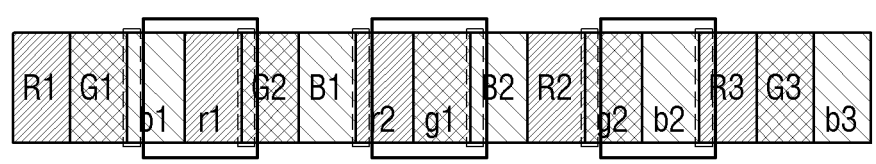

FIGS. 7A-7C illustrate a configuration of the barrier which blocks the frame generated as shown in FIG. 6 on a basis of two sub pixels. FIG. 7A illustrates a state in which the barrier matches pixels. When the user moves to the right in this state, the light blocking region of the barrier is shifted to the left as shown in FIG. 7B. On the other hand, when the user moves to the left, the light blocking region of the barrier is shifted to the right as shown in FIG. 7C. Although an area of some of the sub pixels recognized by the left eye or right eye may be reduced as the light blocking region is shifted as described above, the sub pixels are uniformly recognized for each color in view of a plurality of pixel units.

Figure 8:
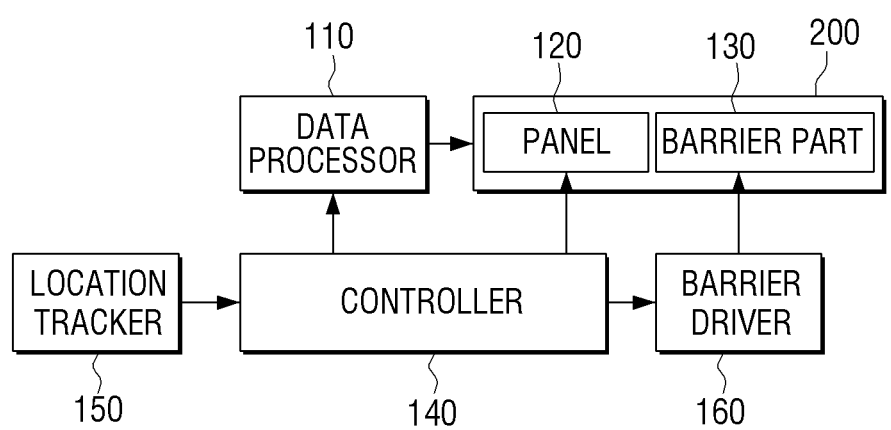
FIG. 8 is a block diagram illustrating a configuration of a 3D display device according to another exemplary embodiment.

FIG. 8 is a block diagram illustrating a configuration of a 3D display device according to another exemplary embodiment. Referring to FIG. 8, the 3D display device includes a data processor 110, a panel 120, a barrier part 130, a controller 140, a location tracker 150, and a barrier driver 160.

The data processor 110 generates a multi-view image as described above. The panel 120 displays the multi-view image generated by the data processor 110.

The barrier part 130 forms a light transmitting region and a light blocking region on the panel 120. The barrier part 130 forms the light transmitting region and the light blocking region on a basis of two sub pixels and reverses positions of the light transmitting region and the light blocking region in each frame.

The barrier driver 160 drives the barrier part 130 under the control of the controller 140. Specifically, the barrier driver 160 applies a driving signal to each electrode of the barrier part 130 so that the positions of the light transmitting region and the light blocking region are reversed every time that each frame is displayed on the panel 120.

The location tracker 150 tracks a user's location. The location tracker 150 detects a user's location using data which is photographed by a photographing unit (not shown) provided in the 3D display device. For example, the location tracker 150 divides an image frame which is photographed by the photographing unit into a plurality of blocks. The location tracker 150 detects a representative value of each block. The representative value is a value representing a characteristic of each block and various values such as a pixel average, a maximum pixel value, a minimum pixel value, and a total pixel value of pixels in each block may be used as a representative value. The location tracker 150 compares the detected representative values, connects blocks that have similar representative values and are continuously placed to one another, and recognizes the connected blocks as a single object. For example, a user's facial part may be recognized as an object. The location tracker 150 compares a previous frame and a current frame and searches for matching objects, compares locations of the searched objects and detects a moving distance and a direction. As described above, the location tracker 150 may detect a movement state of the user.

The controller 140 controls the data processor 110, the panel 120, and the barrier part 130. The controller 140 controls the data processor 110 to change a combination pattern of a left-eye image and a right-eye image according to a user's location which is tracked by the location tracker 150.

When the user's location, which is tracked by the location tracker 150, is within a normal field of view, the data processor 110 alternately places two left-eye sub pixels of a pixel of a left-eye image and two right-eye sub pixels of a pixel of a right-eye image to correspond to a left eye and a right eye of the user, respectively.

The data processor 110 may reverse positions of the two left-eye sub pixels and the two right-eye sub pixels every time that each frame is output to the panel 120.

When the location tracker 150 senses that the user's location is changed, the data processor 110 shifts the two left-eye sub pixels and the two right-eye sub pixels on a basis of one sub pixel according to the user's movement.

FIGS. 9, 10, 11 and 12 illustrate an example of a method for shifting a sub pixel position of a frame according to a movement of the user according to an exemplary embodiment. FIGS. 9, 10, 11 and 12 illustrate an operation of the 3D display device generating two frames by combining a left-eye image and a right-eye image to prevent deterioration of resolution. A width of each line of the barrier part 130 is designed on a basis of two sub pixels of the panel 120. The panel 120 receives location data of the user from the location tracker 150 on a real time basis, and places a left-eye image and a right-eye image of first and second frames on a basis of four sub pixels according to a viewing location.

Figure 9:
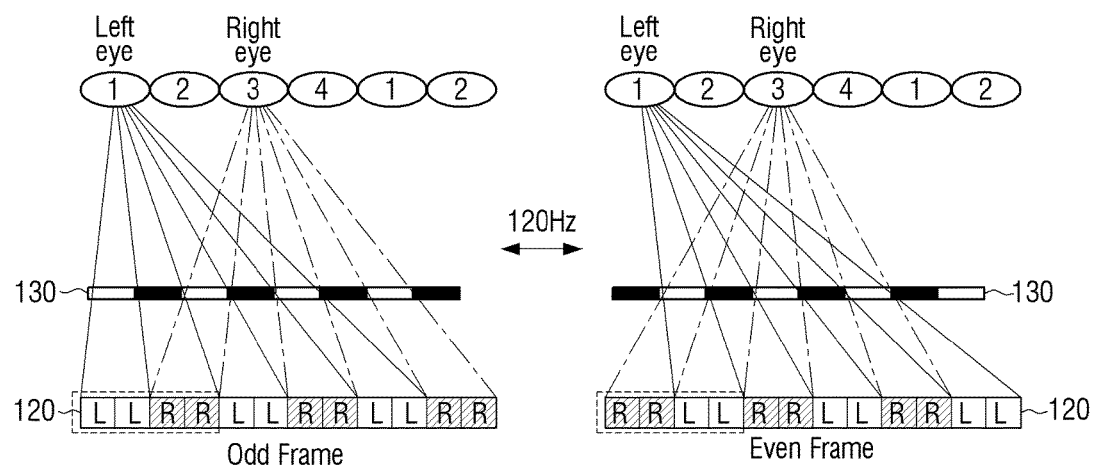
FIGS. 9, 10, 11 and 12 are views to explain a process of shifting sub pixels of a frame according to a movement of a user according to an exemplary embodiment.

Referring to FIG. 9, when it is determined that the left eye and the right eye are placed in positions 1 and 3 which are within a normal field of view, the panel 120 of the 3D display device alternately displays a first frame in which two left-eye sub pixels (L, L) and two right-eye sub pixels (R, R) are alternately placed, and a second frame in which two right-eye sub pixels (R, R) and two left-eye sub pixels (L, L) are alternately placed in the opposite order of the first frame.

The barrier part 130 reverses an ON/OFF pattern when the first frame is displayed and an ON/OFF pattern when the second frame is displayed. Accordingly, the left-eye sub pixels of the two frames are continuously recognized by the left eye and the right-eye sub pixels of the two frames are continuously recognized by the right eye. The operation of displaying each frame and the operation of reversing of the barrier part 130 may be performed according to an operation frequency of 120 Hz or greater.

Figure 10:
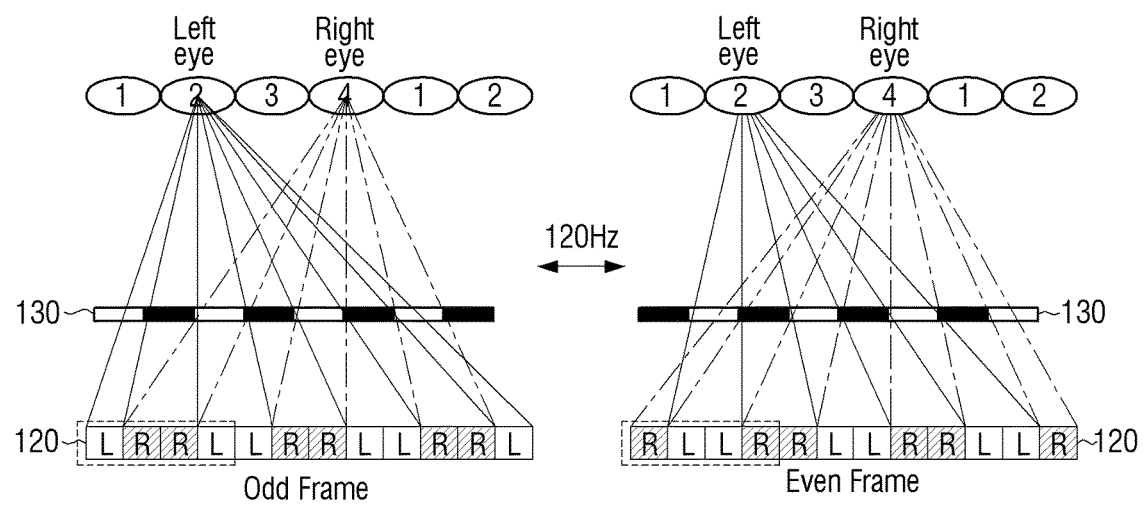

FIG. 10 illustrates a case in which the user's left eye and right eye are moved to positions 2 and 4. The panel 120 shifts the sub-pixels by one sub pixel in the opposite direction of the moving direction of the user. That is, in the first frame, the left-eye sub pixels and the right-eye sub pixels are repeated in the pattern LRRLLRRLLRRLL, and, in the second frame, the sub-pixels are repeated in the opposite pattern RLLRRLLRRLLRRLL. The barrier part 130 is driven in the same way as in FIG. 9.

Figure 11:
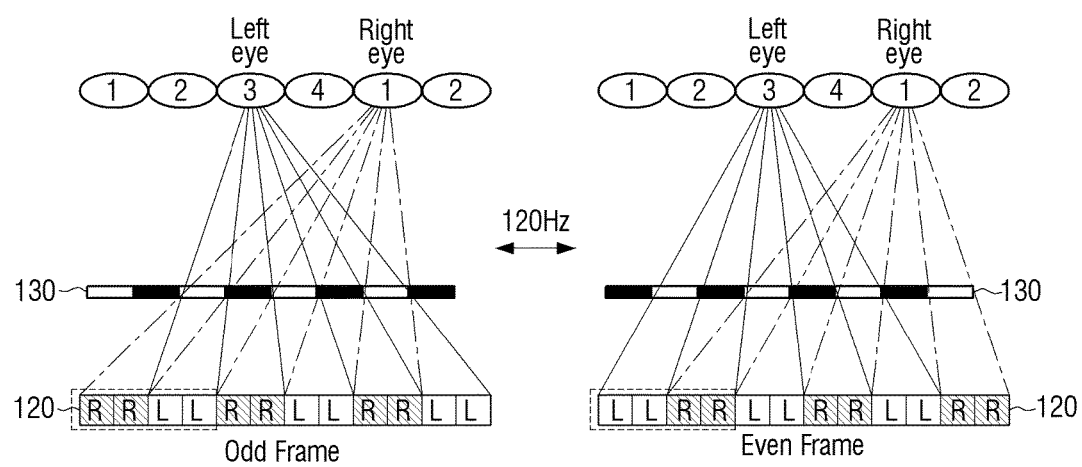

FIG. 11 illustrates a case in which the user's left eye and right eye are moved to positions 3 and 1. In this case, the panel 120 generates first and second frames by placing the left-eye sub pixels and the right-eye sub pixels in the opposite pattern of the pattern of FIG. 9.

Figure 12:
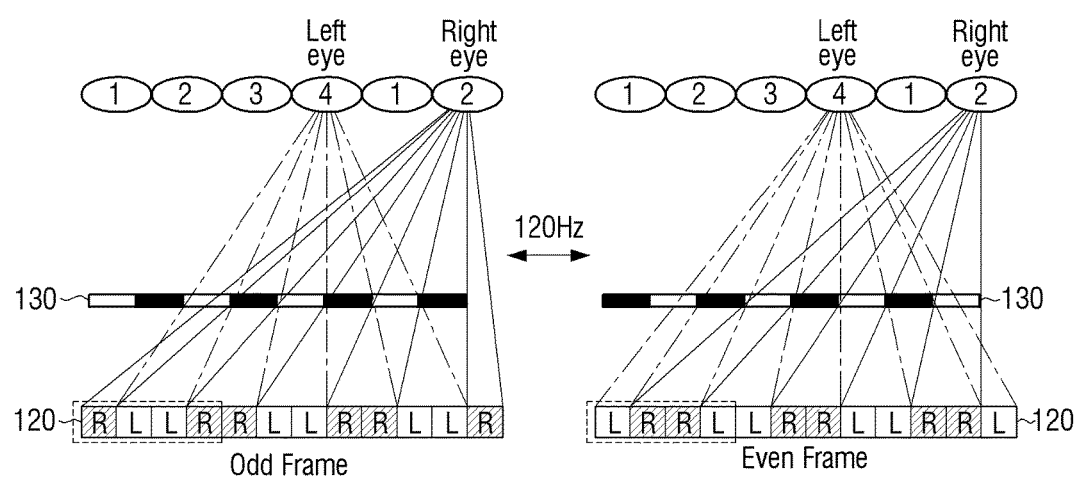

FIG. 12 illustrates a case in which the user's left eye and right eye are moved to positions 4 and 2. Referring to FIG. 12, first and second frames are generated by placing the left-eye sub pixels and the right-eye sub pixels in the opposite pattern of the pattern of FIG. 10.

FIGS. 13, 14, 15 and 16 illustrate a method for configuring a frame in a 3D display device which is operated in a high speed parallax barrier method without reducing resolution according to an exemplary embodiment.

Figure 13:
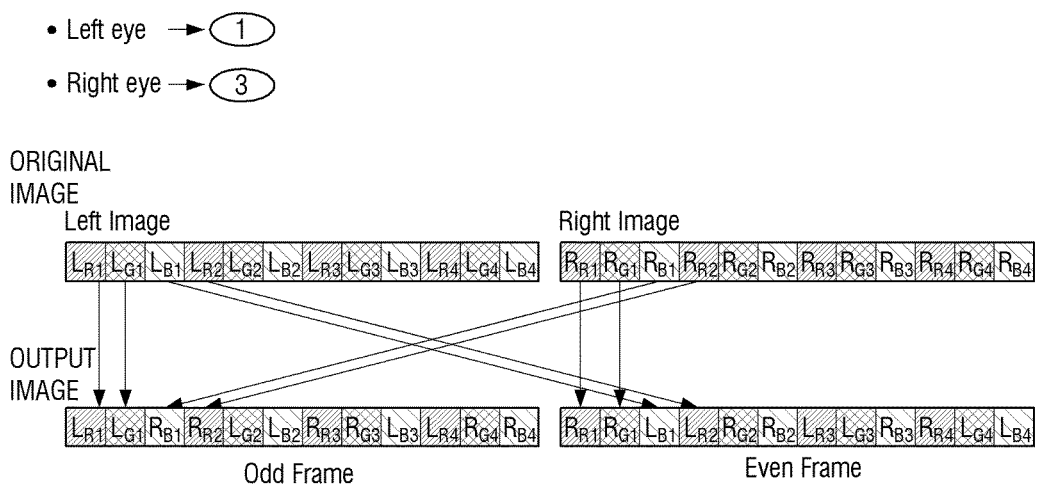
FIGS. 13, 14, 15 and 16 are views to explain a method for placing sub pixels in the shifting process of FIGS. 9, 10, 11 and 12.

FIG. 13 illustrates a sub pixel placing pattern in a frame when the user is located within a normal field of view as shown in FIG. 9. Referring to FIG. 13, when the user's left eye and right eye are placed in positions 1 and 3, two sub pixels of each pixel of a left-eye image are grouped in sequence and distributed to a first frame and a second frame. Also, two sub pixels of each pixel of a right-eye image are grouped in sequence and distributed to the first and second frames. Accordingly, the first frame is comprised of LR1, LG1, RB1, RR2, LG2, LB2, RR3, RG3, LB3, LR4, RG4, and RB4. The second frame is comprised of RR1, RG1, LB1, LR2, RG2, RB2, LR3, LG3, RB3, RR4, LG4, and LB4.

Figure 14:
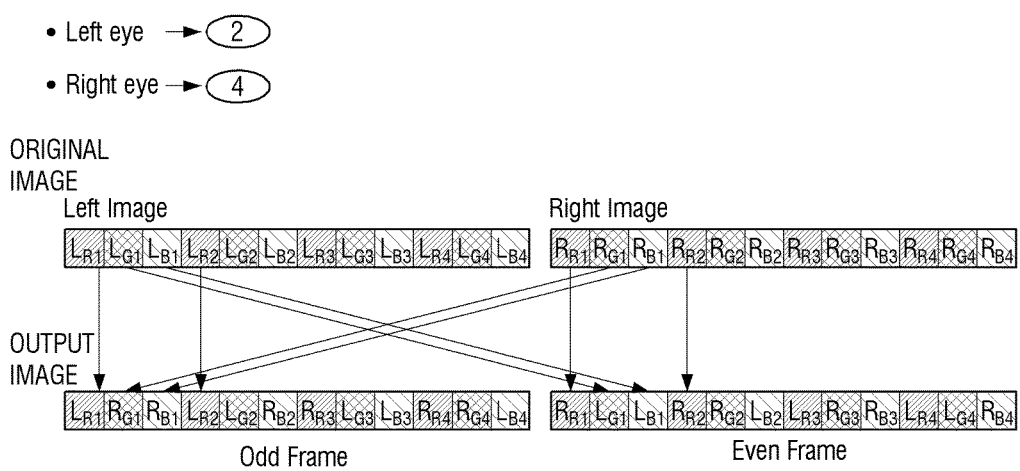
Figure 15:
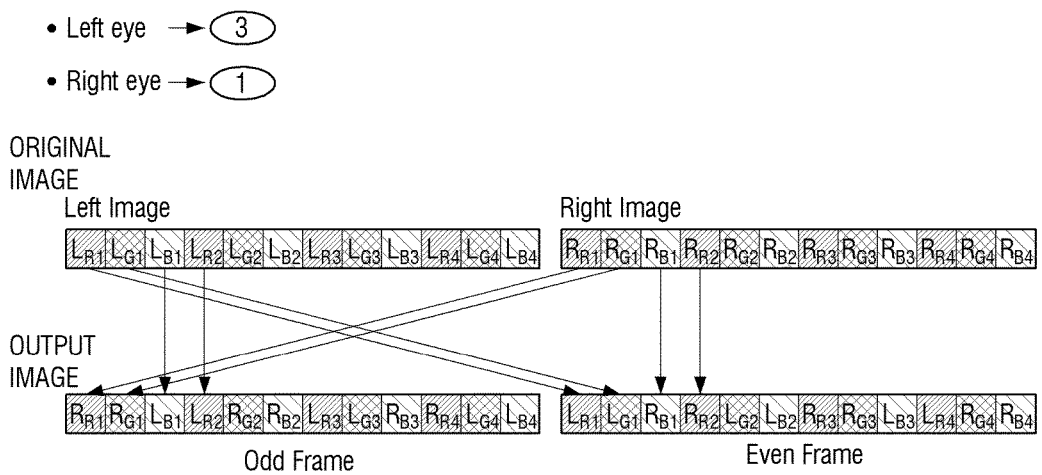
Figure 16:
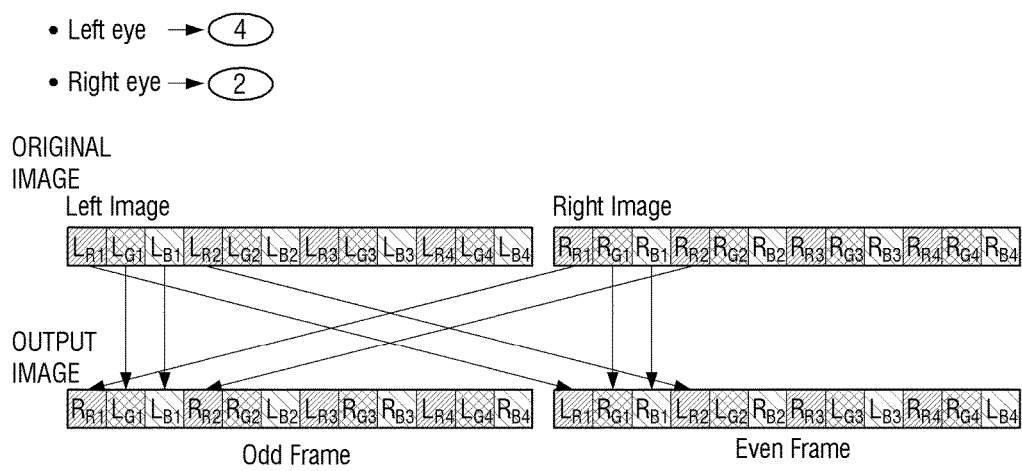

FIGS. 14, 15 and 16 illustrate sub pixel placing patterns corresponding to the cases of FIGS. 10, 11, 12. As described above, the frame is configured by shifting the sub pixels on a basis of one sub pixel according to a user's movement.

Figure 17:
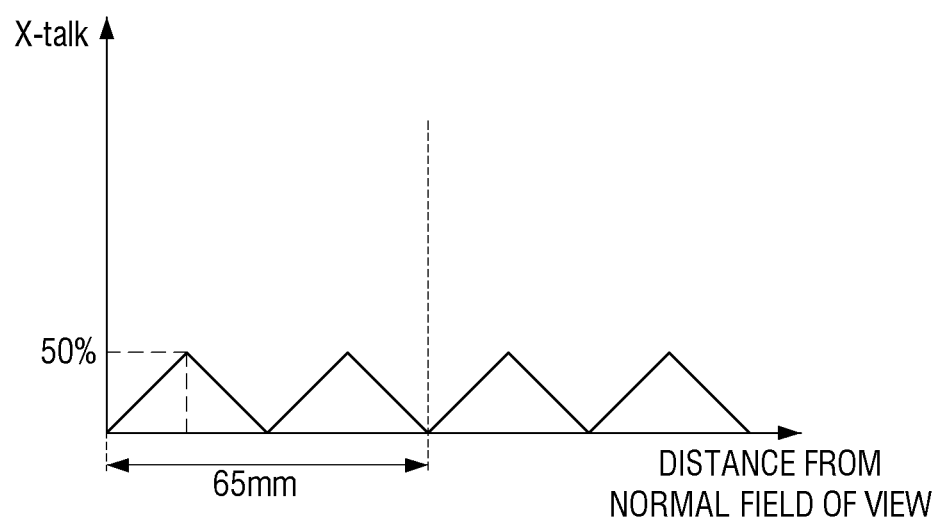
FIG. 17 is a view to explain an effect of attenuating crosstalk when sub pixels are shifted in the method of FIGS. 9, 10, 11 and 12.

FIG. 17 illustrates crosstalk which occurs when a frame is configured by placing left-eye sub pixels and right-eye sub pixels as shown in FIGS. 13, 14, 15 and 16. A related-art 3D display device of a parallax barrier configuration causes crosstalk of 100% when the user moves by 65/2 mm, and reverses left and right images when the user moves by 65 mm. However, referring to FIG. 17, when a distance between the left eye and the right eye is 65 mm and the user moves by 65 mm, crosstalk (x-talk) of about 50% occurs two times. Accordingly, the problem that the left and right images are reversed at a specific point of time can be solved and also the maximum crosstalk can be reduced by half. Also, when the sub pixels are distributed for each color on a basis of two sub pixels as described above, a color shift phenomenon can be solved.

Figure 18:
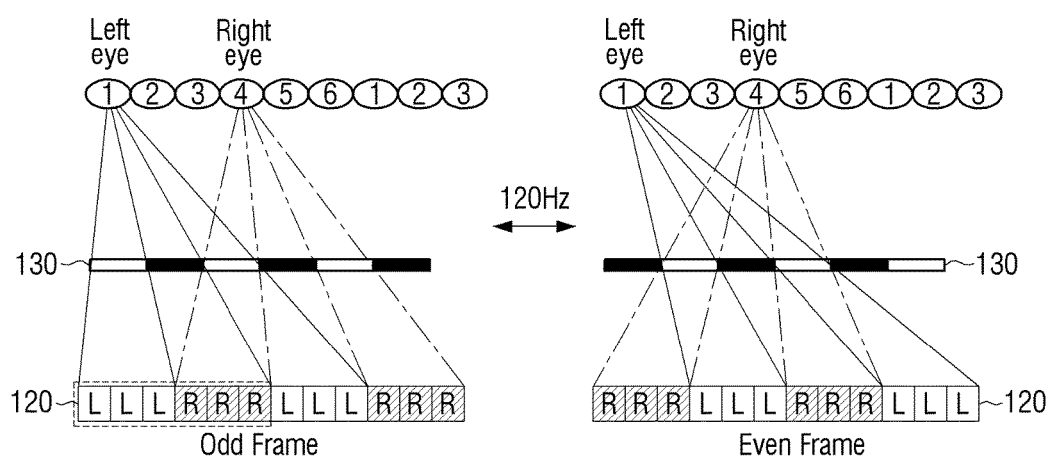
FIG. 18 is a view to explain a method for configuring a frame by combining a left-eye image and a right-eye image on a basis of three sub pixels according to an exemplary embodiment.

FIG. 18 illustrates a barrier which is designed on a basis of three sub pixels according to another exemplary embodiment. Referring to FIG. 18, the panel 120 displays a first frame having a pattern of LLLRRRLLLRRR and a second frame having a pattern of RRRLLLRRRLLL in sequence.

FIG. 19 illustrates a the method for configuring the frame of FIG. 18 in detail. As shown in FIG. 19, the left-eye sub pixels and the right-eye sub pixels of the first and second frames are placed in different positions on a basis of six sub pixels according to positions of the left eye and the right eye. Referring to FIG. 19, the sub pixels of the first frame and the second frame are shifted on a basis of one sub pixel in the opposite direction of the moving direction of the user. Accordingly, a viewing distance is reduced and crosstalk in which the left-eye image and the right-eye image are mixed is reduced.

Figure 20:
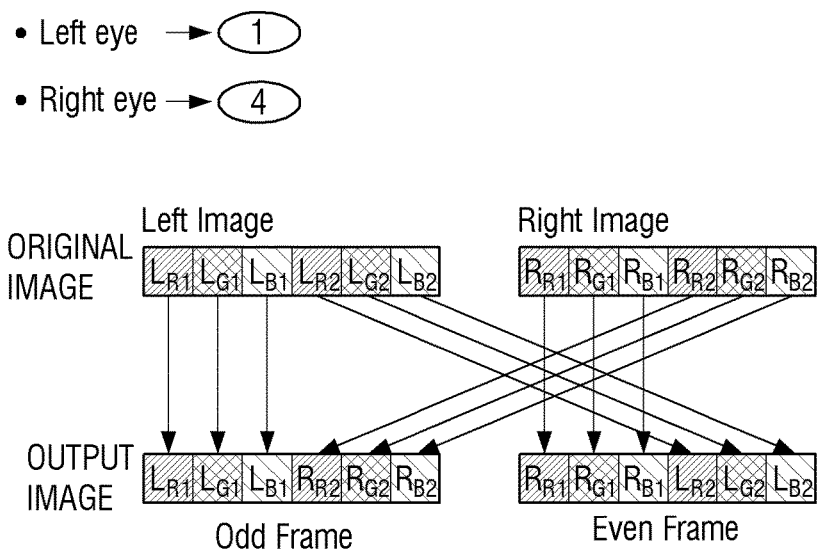
FIGS. 20 and 21 are views to explain a method for shifting sub pixels on a basis of three sub pixels according to a movement of a user according to an exemplary embodiment.
Figure 21:
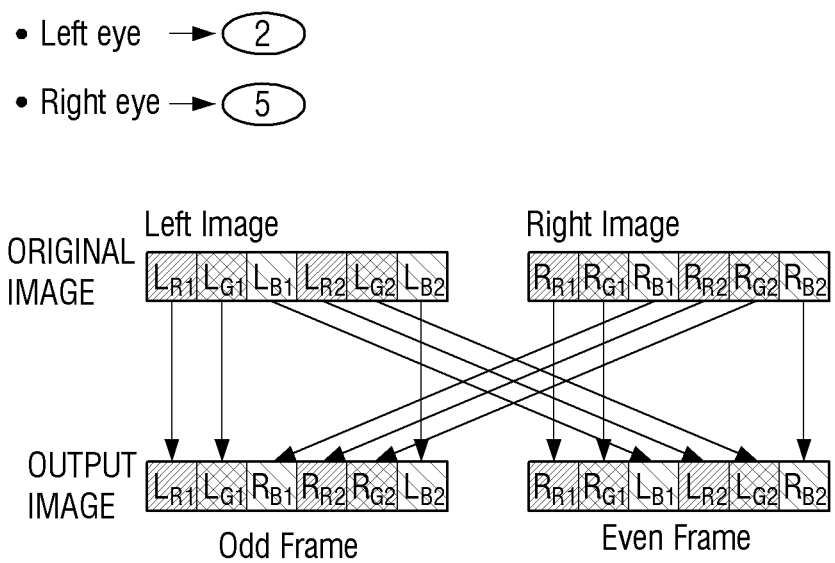

FIGS. 20 and 21 illustrate a pattern in which sub pixels of a left-eye image and a right-eye image are placed according to the exemplary embodiment of FIG. 18. Referring to FIGS. 20 and 21, three sub pixels of the left-eye image and three sub pixels of the right-eye image are distributed to a first frame and a second frame. When the left eye and the right eye are placed in positions 1 and 4, the first frame is generated to have a pattern LLLRRR (LR1, LG1, LB1, RR2, RG2, RB2) and the second frame is generated to have a pattern RRRLLL (RR1, RG1, RB1, LR2, LG2, LB2). After that, when the left eye and the right eye are placed in positions 2 and 5, the first frame is generated to have a pattern LLRRRL (LR1, LG1, RB1, RR2, RG2 and LB2) and the second frame is generated to have the pattern RRLLLR (RR1, RG1, LB1, LR2, LG2, RB2).

Figure 22:
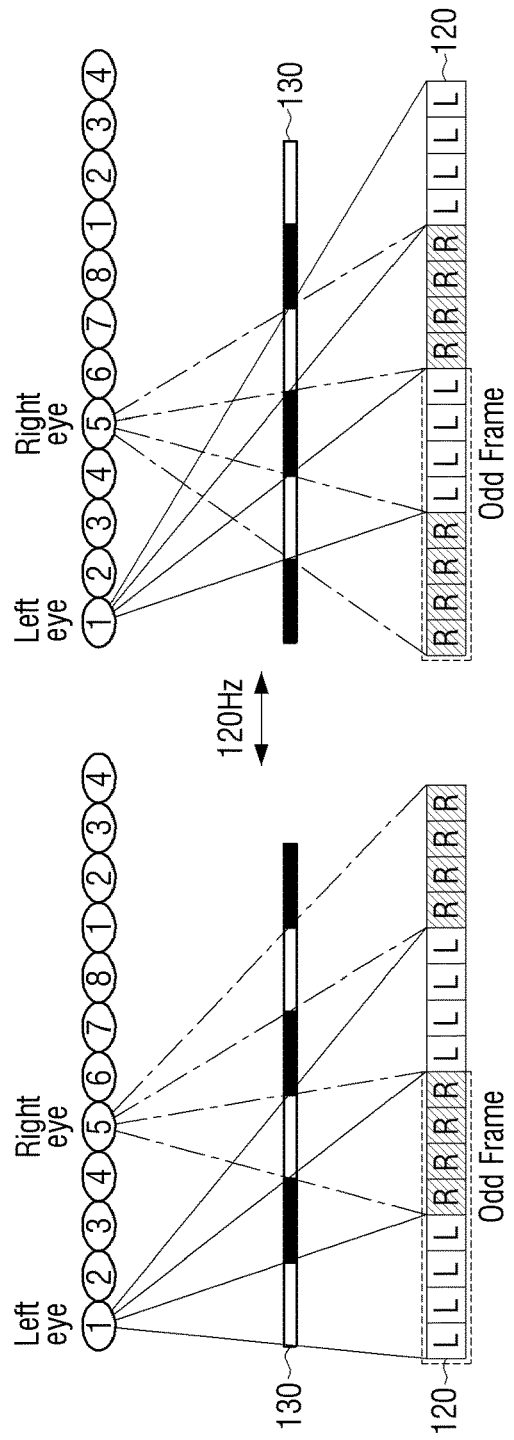
FIG. 22 is a view to explain a method for configuring a frame by combining a left-eye image and a right-eye image on a basis of four sub pixels according to an exemplary embodiment.

FIG. 22 illustrates a barrier which is designed on a basis of four sub pixels according to another exemplary embodiment. If a width of each line of a parallax barrier is designed on a basis of four sub pixels, the panel 120 displays a first frame having a pattern of LLLLRRRRLLLLRRRR and a second frame having a pattern of RRRRLLLLRRRRLLLL in sequence.

FIG. 23 is a view to explain the method for configuring the frame of FIG. 22 in detail. As shown in FIG. 23, the left-eye sub pixels and the right-eye sub pixels of the first frame and the second frame are placed in different positions on a basis of eight sub pixels according to positions of the left eye and the right eye. Referring to FIG. 23, the sub pixels are shifted in the first frame and the second frame on a basis of one sub pixel in the opposite direction of the moving direction of the user. Accordingly, a viewing distance is reduced and crosstalk in which the left-eye image and the right-eye image are mixed is reduced.

Figure 24:
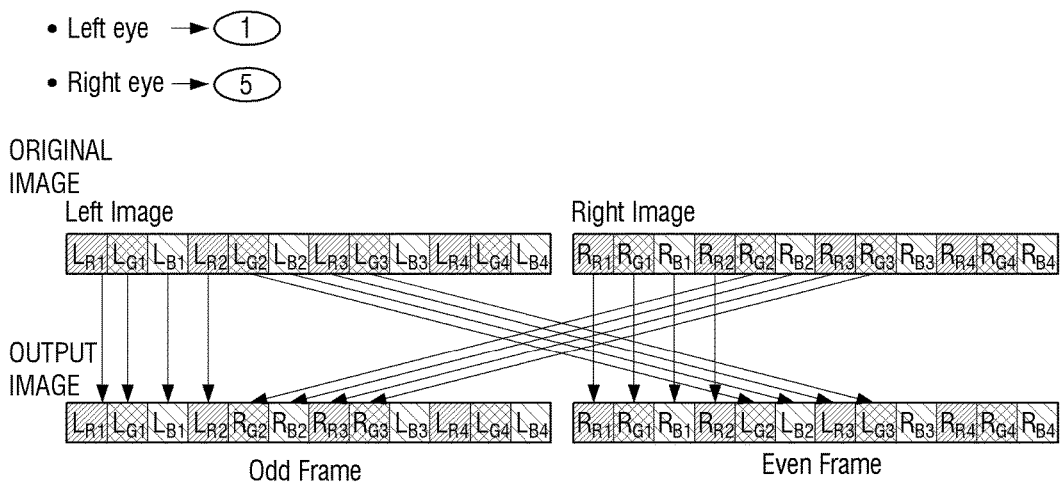
FIGS. 24 and 25 are views to explain a method for shifting sub pixels on a basis of four sub pixels according to a movement of a user according to an exemplary embodiment.
Figure 25:
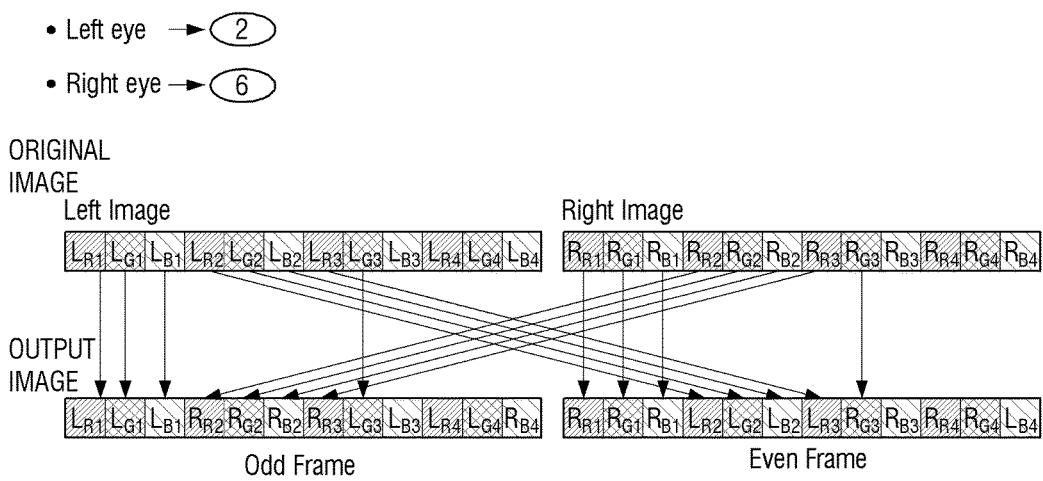

FIGS. 24 and 25 illustrate a pattern in which sub pixels of a left-eye image and a right-eye image are placed according to the exemplary embodiment of FIG. 23. Referring to FIGS. 24 and 25, four sub pixels of the left-eye image and four sub pixels of the right-eye image are distributed to a first frame and a second frame. As shown in FIG. 24, when the left eye and the right eye are placed in positions 1 and 5, the first frame is generated to have a pattern of LLLLRRRR and the second frame is generated to have a pattern of RRRRLLLL. After that, as shown in FIG. 25, when the left eye and the right eye are placed in positions 2 and 6, the first frame is generated to have a pattern LLLRRRRL and the second frame is generated to have a pattern RRRLLLLR.

Figure 26:
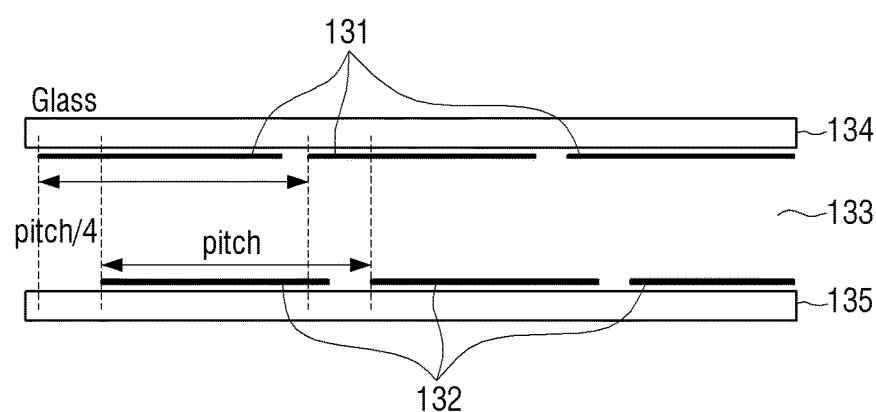
FIG. 26 is a view illustrating a configuration of a barrier according to another exemplary embodiment.

FIG. 26 is a view illustrating a configuration of a barrier according to still another exemplary embodiment. Referring to FIG. 26, the barrier part 130 includes a liquid crystal layer 133, an upper electrode 131, a lower electrode 132, an upper glass 134, and a lower glass 135. The upper electrode 131 and lower electrode 132 may each include a plurality of electrodes.

The liquid crystal layer 133 is provided in a plate shape, and the upper electrode 131 and the lower electrode 132 partially overlap each other with the liquid crystal layer 133 disposed therebetween. The upper electrode 131 is disposed on a top surface of the liquid crystal layer 133 to have a predetermined gap between each of the upper electrodes constituting the upper electrode 131.

The lower electrode 132 is disposed on a lower surface of the liquid crystal layer 133, alternating with the upper electrode 131 by ¼ pitch. The pitch recited herein may be a size that is obtained by adding the gap and a width of one upper electrode.

The upper electrodes 131 may be electrically separated from one another and may be controlled by the controller 130 individually. The lower electrodes 132 may be configured the same as the upper electrode 131. Accordingly, a light transmitting region of the barrier part 130 may be shifted on a basis of ¼ pitch.

FIGS. 27, 28, 29, 30 and 31 are views illustrating a frame shift in the 3D display device which uses the barrier part 130 configured as shown in FIG. 26 when the user changes his or her location according to an exemplary embodiment.

Figure 27:
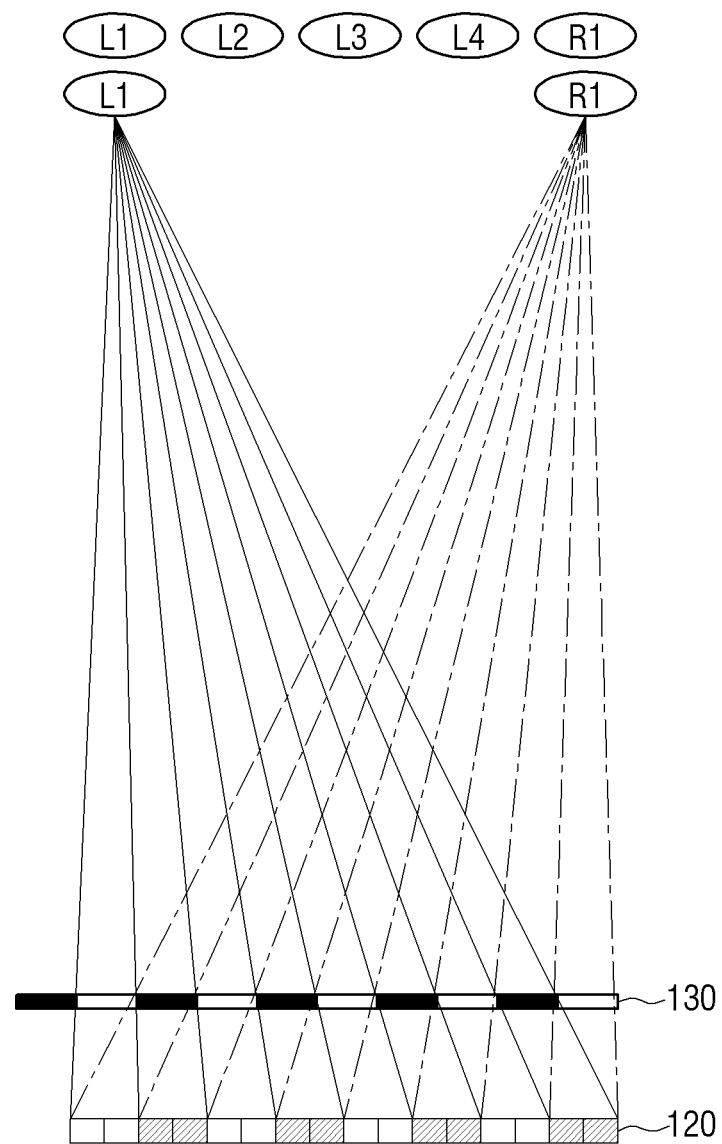
FIGS. 27, 28, 29, 30 and 31 are views to explain a process of changing a frame according to a movement of a user in a panel in which the barrier of FIG. 26 is disposed.

FIG. 27 illustrates a frame in a field of view of ⅛ which is a reference field of view. Referring to FIG. 27, sub pixels are placed in a frame in a pattern of RRLLRRLLRRLL. In an exemplary embodiment in which resolution is compensated, another frame in which sub pixels are placed in the reverse pattern of the previous frame may be generated. The barrier part 130 distinguishes between a left-eye image and a right-eye image on a basis of two sub pixels.

Figure 28:
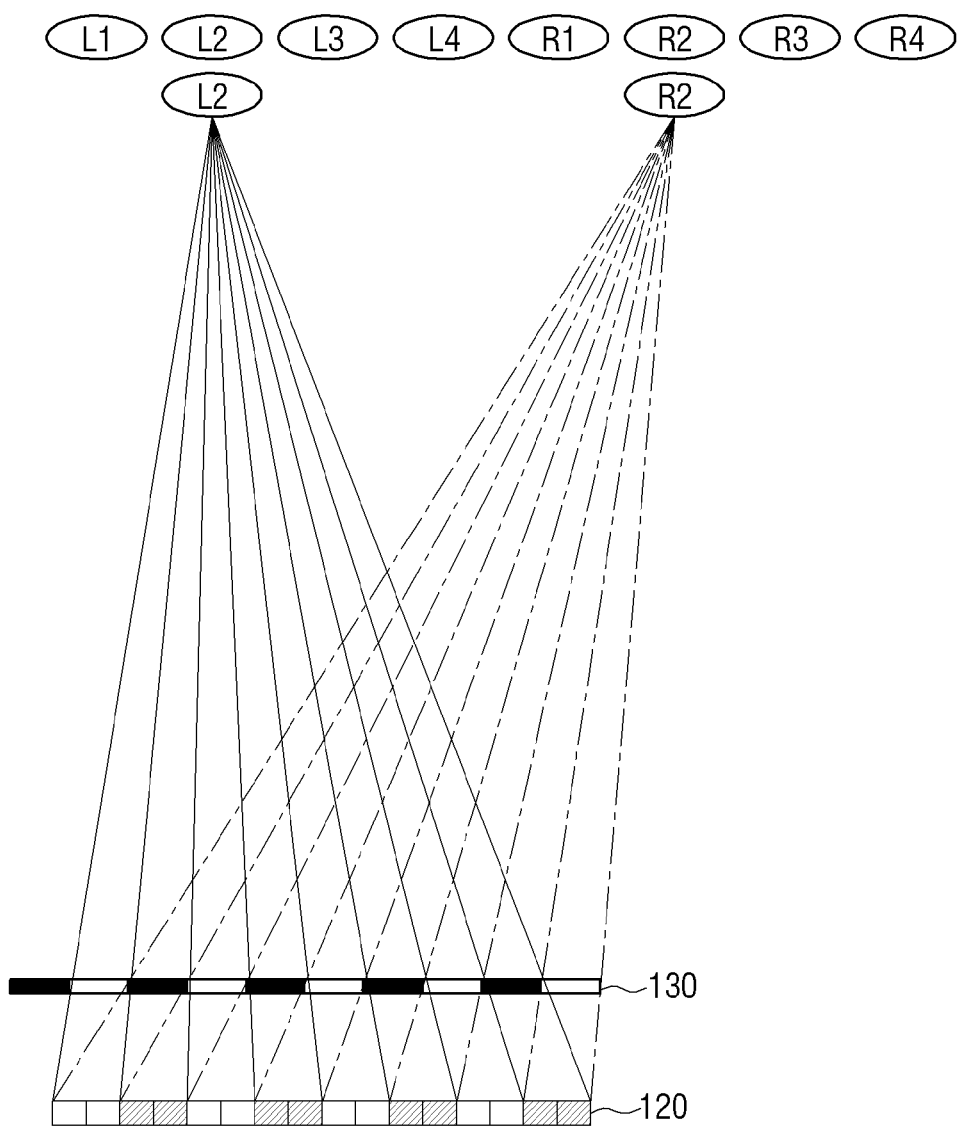

FIG. 28 illustrates a state in which the user moves to the right by ⅛ of the entire field of view. In this case, the frame is maintained in the pattern of RRLLRRLLRRLL, but the barrier part 130 shifts the light transmitting region by ¼ pitch. Accordingly, crosstalk can be further reduced.

Figure 29:
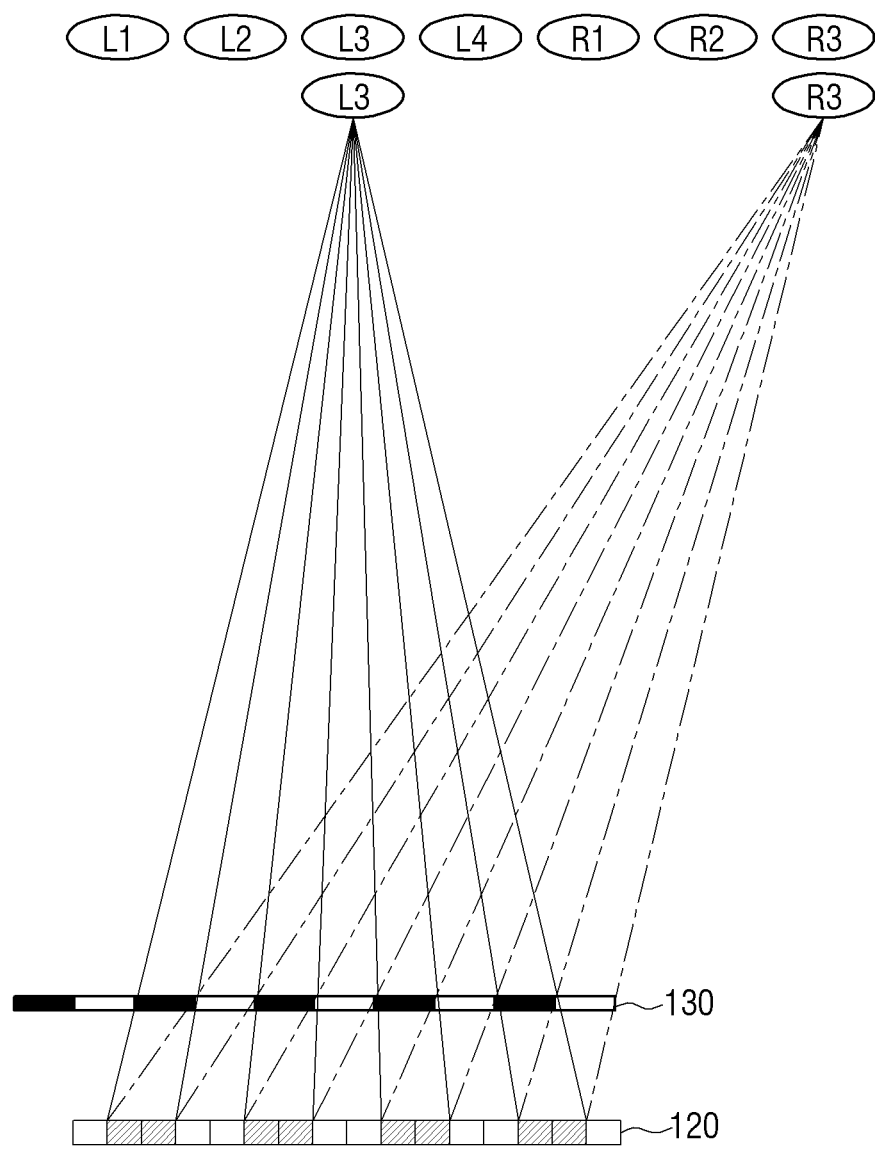

FIG. 29 illustrates a state in which the user moves to the right by ⅜ of the entire field of view. In this case, the barrier part 130 is driven in the same way as in the reference field of view, and the panel 120 is shifted by one sub pixel.

Figure 30:
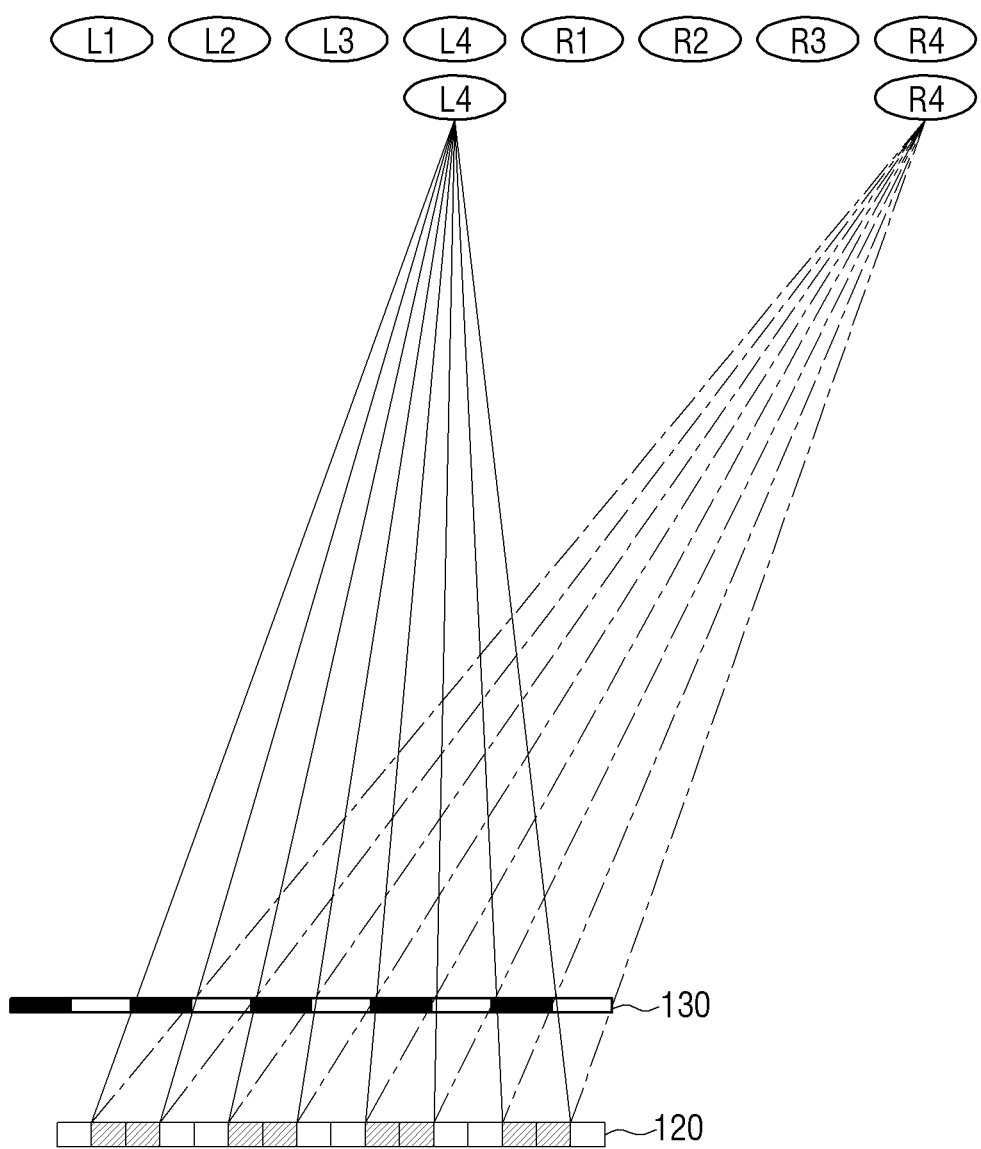

FIG. 30 illustrates a state in which the user moves to the right by ⅘ of the entire field of view. In this case, the panel 120 displays the same frame as in FIG. 29 and the barrier part 130 shifts the light transmitting region by ¼ pitch.

Figure 31:
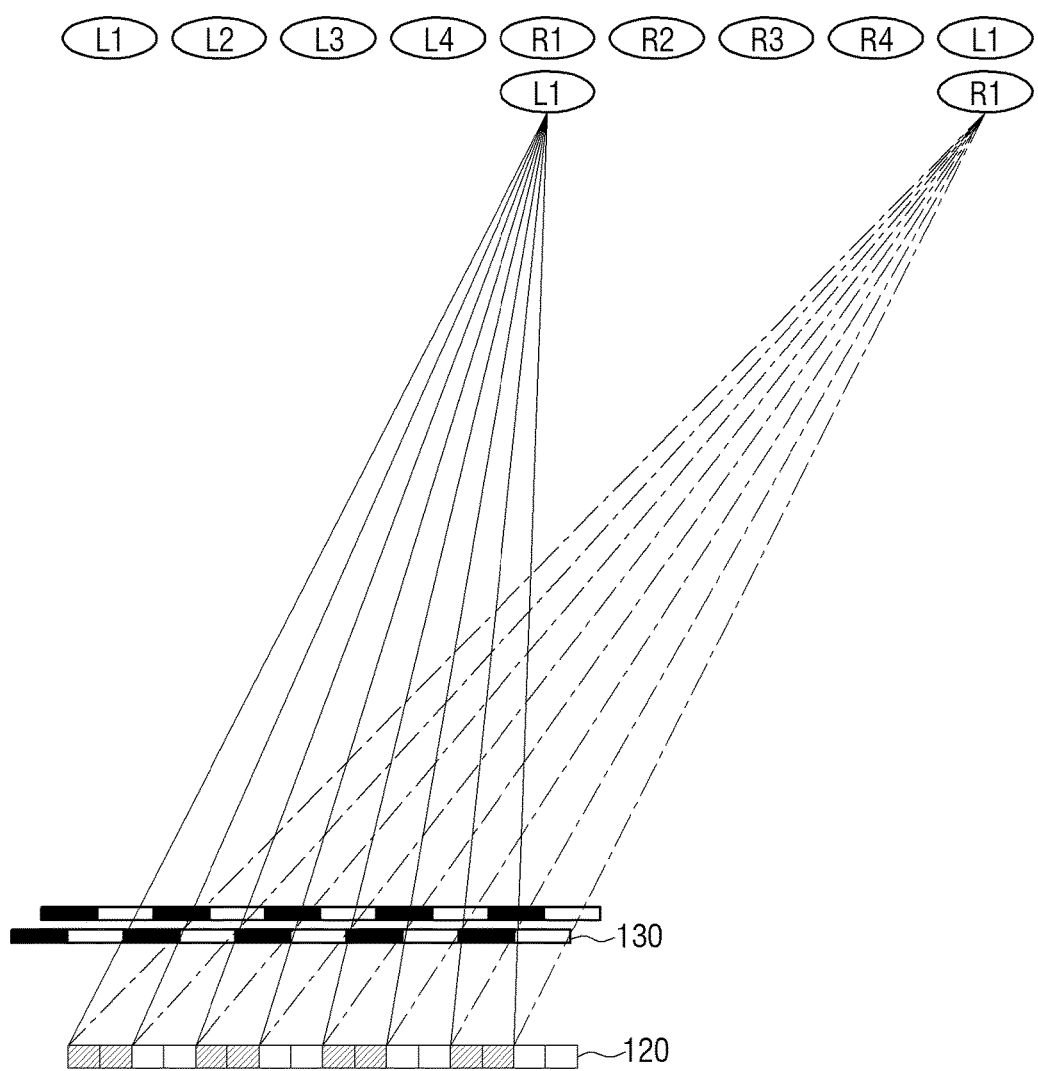

FIG. 31 illustrates a state in which the user moves by ⅝. The panel 120 reverses positions of the left-eye image and the right-eye image in comparison with the frame in the reference field of view. The barrier part 130 forms the same light transmitting region as in the reference field of view.

FIG. 32 is a view illustrating a condition for driving the barrier and the panel according to a user's location in the exemplary embodiments of FIGS. 27 to 31.

FIG. 32 shows a driving condition with reference to a left eye. When the left eye is in position L1, the barrier part 130 turns off P1 and P2 and the panel 120 displays a frame of a pattern of LLRR. When the left eye moves to position L2, the barrier part 130 shifts the light transmitting region by ¼ pitch and the panel 120 displays a frame of a pattern of LLRR.

When the left eye moves to position L3, the barrier part 130 returns the light transmitting region to a reference barrier position, and the panel 120 displays a frame having a pattern of RLLR. When the left eye moves to position L4, the barrier part 130 shifts the light transmitting region by ¼ pitch again and the panel 120 displays a frame having a pattern of RLLR. The barrier part 130 is driven to form a reference barrier pattern and a ¼ shift pattern alternately every time that the user moves to positions L5 to L8 in sequence. The barrier driver 160 of FIG. 8 individually drives the upper electrode and the lower electrode so that the reference barrier pattern and the ¼ shift pattern are alternately formed.

The panel 120 displays a frame in which sub pixels are shifted by one sub pixel every time that the barrier part 130 is driven in the reference barrier pattern.

Figure 33:
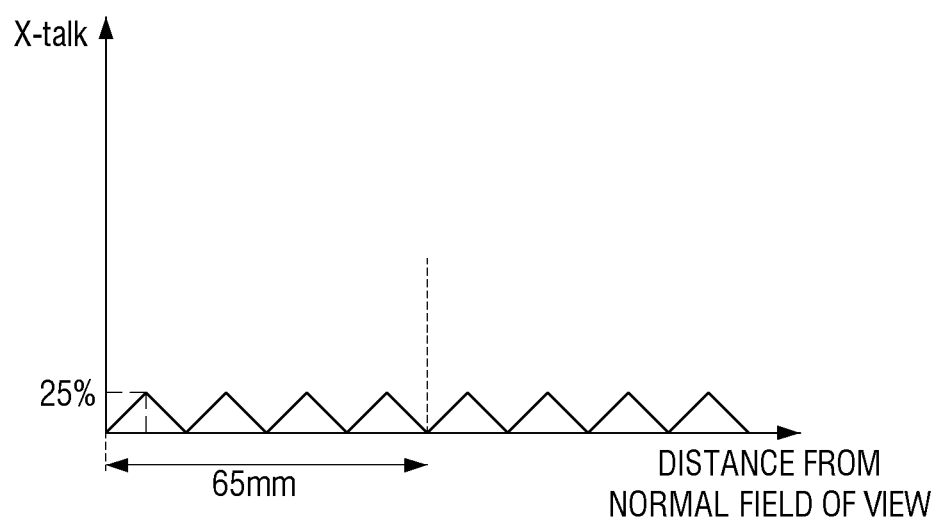
FIG. 33 is a view to explain an effect of attenuating crosstalk when sub pixels are shifted in the method of FIGS. 27, 28, 29, 30 and 31.

FIG. 33 is a graph showing an effect of attenuating crosstalk in the exemplary embodiments of FIGS. 27 to 31. Referring to FIG. 33, the upper electrodes and the lower electrodes cross each other by ¼ pitch so that a problem of the related art in which a left-eye image and a right-eye image are reversed according to a viewing location of the user can be solved. Also, crosstalk in which a left-eye image and a right-eye image are mixed can be solved. If crosstalk in which a reverse image is generated is 200% in the related-art device, the crosstalk can be reduced to 25% in the present exemplary embodiments.

Figure 34:
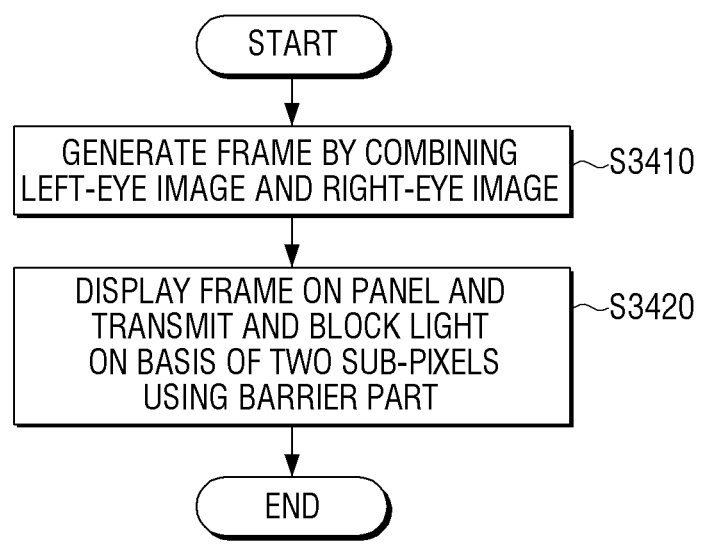
FIGS. 34 and 35 are flowcharts to explain a 3D display method according to various exemplary embodiments.

FIG. 34 is a flowchart to explain a 3D display method according to an exemplary embodiment. Referring to FIG. 34, a frame is generated by combining a left-eye image and a right-eye image at operation S3410.

The panel displays the frame, and light emitted from the panel is transmitted or blocked on a basis of two sub pixels using the barrier part at operation S3420.

Figure 35:
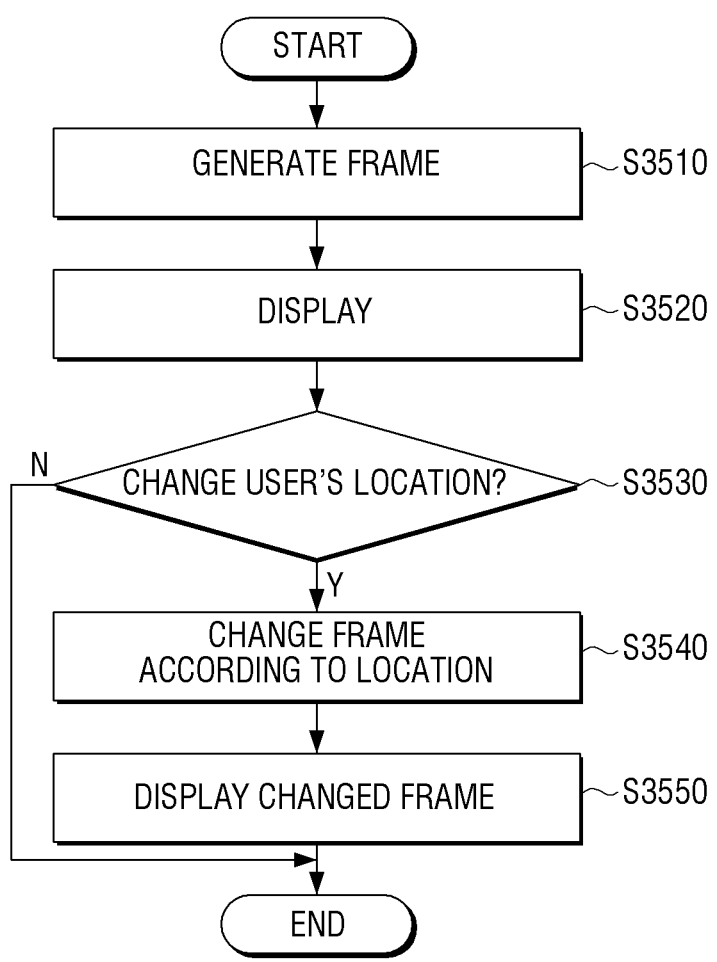

FIG. 35 is a flowchart to explain a 3D display method according to another exemplary embodiment.

Referring to FIG. 35, a frame is generated by combining a left-eye image and a right-eye image at operation S3510. The generated frame is displayed on the panel at operation S3520. The frame is generated, for example, by placing two left-eye sub pixels and two right-eye sub pixels alternately. The barrier part forms a light transmitting region and a light blocking region alternately on a basis of two sub pixels.

When the user changes his or her location at operation S3530), the 3D display device changes the frame by shifting sub pixels according to the user's location at operation S3540. The 3D display device adjusts a driving state of the barrier in synchronization with the display of the changed frame.

Changing the frame and adjusting the driving state of the barrier may be performed in various ways according to the above-described exemplary embodiments. The exemplary embodiments may be appropriately selected considering a viewing distance and crosstalk, and may be applied to the 3D display device.

Since the exemplary embodiments have been described above in detail, a detailed illustration and a redundant explanation thereof are omitted.

According to the exemplary embodiments as described above, an appropriate viewing distance is provided and color shift and crosstalk are reduced even if the user changes his or her location. As a result, the user can view 3D content effectively.

A program to perform the methods according to the above-described exemplary embodiments may be stored in various kinds of recording media and used.

Specifically, a code to perform the above-described methods may be stored in various kinds of recording media readable by a terminal, such as a random access memory (RAM), a flash memory, a read only memory (ROM), an erasable programmable ROM (EPROM), an electronically erasable and programmable ROM (EEPROM), a register, a hard disk, a removable disk, a memory card, a USB memory, and a CD-ROM.

The foregoing exemplary embodiments and advantages are merely exemplary and are not to be construed as limiting the present disclosure. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A 3D display device comprising:
   a panel which comprises pixels, each pixel comprising three sub pixels;
   a barrier which comprises a light blocking region and a light transmitting region on a basis of two sub pixels; and
   a camera;
   a processor configured to:
      obtain at least one frame by placing a left-eye image and a right-eye image alternately on the basis of two sub pixels, and
      control the panel to display the at least one frame, wherein two left-eye sub pixels of the left-eye image and two right-eye sub pixels of the right-eye image are placed alternately in the at least one frame, and
   wherein based on a location of a user obtained by the camera being changed, the two left-eye sub pixels and the two right-eye sub pixels are shifted on a basis of one sub pixel, and
   wherein the barrier comprises:
      a liquid crystal layer;
      a plurality of upper electrodes which are disposed on an upper surface of the liquid crystal layer and which have a predetermined gap between each other; and
      a plurality of lower electrodes which are disposed on a lower surface of the liquid crystal layer parallel to the upper surface,
      wherein the 3D display device further comprises a barrier driver which is configured to drive the plurality of upper electrodes and the plurality of lower electrodes individually so that a first barrier pattern and a second barrier pattern are alternately formed according to a movement of the user, wherein the second barrier pattern is a barrier pattern where the light blocking region and the light transmitting region are shifted based on the first barrier pattern, wherein the plurality of lower electrodes are offset from the plurality of upper electrodes by ¼ pitch on the lower surface of the liquid crystal layer, the pitch being a sum of the predetermined gap and a width of one upper electrode, and wherein the data processor shifts two left-eye sub pixels and two right-eye sub pixels, which are alternately placed, on a basis of one sub pixel in a direction opposite to a direction of the movement of the user every time that the first barrier pattern is formed.

2. The 3D display device as claimed in claim 1, wherein the data processor is configured to obtain a first frame and a second frame as the at least one frame and to disperse sub pixels constituting one pixel in one of the left-eye image or the right-eye image to position at least one of the dispersed sub pixels in the first frame and position at least one of the dispersed sub pixels in the second frame, and a left-eye image sub pixel position and a right-eye image sub pixel position in the first frame are opposed to a left-eye image sub pixel position and a right-eye image sub pixel position in the second frame, and wherein the data processor is configured to disperse sub pixels constituting two continuous pixels in the left-eye image and sub pixels constituting two continuous pixels in the right-eye image to positions of two pixels of the first frame and positions of two pixels of the second frame, thereby obtain the first frame and the second frame in which the sub pixels of the left-eye image and the sub pixels of the right-eye image are alternately placed on the basis of two sub pixels.

3. The 3D display device as claimed in claim 2, wherein the data processor is configured to place R and G sub pixels of a first pixel of the right-eye image on R and G sub pixels of a first pixel of the first frame, to place a B sub pixel of the first pixel of the right-eye image on a B sub pixel of a first pixel of the second frame, to place an R sub pixel of a second pixel of the right-eye image on an R sub pixel of a second pixel of the second frame, to place G and B sub pixels of the second pixel of the right-eye image on G and B sub pixels of a second pixel of the first frame, to place r and g sub pixels of a first pixel of the left-eye image on r and g sub pixels of the first pixel of the second frame, to place a b sub pixel of the first pixel of the left-eye image on a b sub pixel of the first pixel of the first frame, to place an r sub pixel of a second pixel of the left-eye image on an r sub pixel of the second pixel of the first frame, and to place g and b sub pixels of the second pixel of the left-eye image on g and b sub pixels of the second pixel of the second frame.

4. The 3D display device as claimed in claim 1, wherein the data processor is configured to obtain a first frame having a pattern by distributing sub pixels of two continuous pixels in the right-eye image and sub pixels of two continuous pixels in the left-eye image to four pixels, and is configured to obtain a second frame by distributing sub pixels of two continuous pixels in the right-eye image and sub pixels of two continuous pixels in the left-eye image to four pixels in a reverse pattern of the pattern of the first frame.

5. The 3D display device as claimed in claim 1, wherein, based on the location of the user being within a normal field of view, the processor alternately places the two left-eye sub pixels of the pixel of the left-eye image and the two right-eye sub pixels of the pixel of the right-eye image to correspond to positions of the user's left eye and right eye, respectively, and based on the location of the user being changed to be outside of the normal field of view, the processor shifts the two left-eye sub pixels and the two right-eye sub pixels on a basis of one sub pixel according to the changed location of the user.

6. The 3D display device as claimed in claim 1, wherein the processor is configured to obtain a first frame and a second frame by placing a left-eye image and a right-eye image alternately on the basis of two sub pixels, wherein the first frame comprises a first sub pixel, the first sub pixel being included in one pixel in one of the left-eye image or the right-eye image, and wherein the second frame comprises a second sub pixel, the second sub pixel being included in the one pixel.

7. A 3D display method comprising:

obtaining at least one frame by placing a left-eye image and a right-eye image alternately on the basis of two sub pixels;

displaying the at least one frame using a panel;

transmitting or blocking light emitted from the panel on a basis of two sub pixels; and forming a first barrier pattern and a second barrier pattern by alternately driving a plurality of upper electrodes and a plurality of lower electrodes individually according to a movement of a user, wherein two left-eye sub pixels of the left-eye image and two right-eye sub pixels of the right-eye image are placed alternately in the at least one frame, wherein based on a location of a user being changed, the two left-eye sub pixels and the two right-eye sub pixels are shifted on a basis of one sub pixel, wherein the plurality of upper electrodes are disposed on an upper surface of a liquid crystal layer and have a predetermined gap between each other, and the plurality of lower electrodes are disposed on a lower surface of the liquid crystal layer parallel to the upper surface, wherein the second barrier pattern is a barrier pattern where a light blocking region and a light transmitting region on the barrier are shifted based on the first barrier pattern, wherein the plurality of lower electrodes are offset from the plurality of upper electrodes by ¼ pitch on the lower surface of the liquid crystal layer, the pitch being a sum of the predetermined gap and a width of one an upper electrode, and wherein the two left-eye sub pixels and two right-eye sub pixels, which are alternately placed, are shifted on a basis of one sub pixel in a direction opposite to a direction of the movement of the user every time that the first barrier pattern is formed.

8. The 3D display method as claimed in claim 7, wherein the obtaining at least one frame comprises obtaining a first frame and a second frame to disperse sub pixels constituting one pixel in one of the left-eye image or the right-eye image to position at least one of the dispersed sub pixels in the first frame and position at least one of the dispersed sub pixels in the second frame, and a left-eye image sub pixel position and a right-eye image sub pixel position in the first frame are opposed to a left-eye image sub pixel position and a right-eye image sub pixel position in the second frame, and wherein the obtaining the at least one frame further comprises distributing sub pixels constituting two continuous pixels in the left-eye image and sub pixels constituting two continuous pixels in the right-eye image to positions of two pixels of the first frame and positions of two pixels of the second frame, thereby obtaining the first frame and the second frame in which the sub pixels of the left-eye image and the sub pixels of the right-eye image are alternately placed on the basis of two sub pixels.

9. The 3D display method as claimed in claim 7, wherein the obtaining the at least one frame comprises obtaining a first frame having a pattern by distributing sub pixels of two continuous pixels in the right-eye image and sub pixels of two continuous pixels in the left-eye image to four pixels, and obtaining a second frame by distributing sub pixels of two continuous pixels in the right-eye image and sub pixels of two continuous pixels in the left-eye image to four pixels in a reverse pattern of the pattern of the first frame.

10. The 3D display method as claimed in claim 7, based on the location of the user being within a normal field of view, alternately placing two left-eye sub pixels of the pixel of the left-eye image and two right-eye sub pixels of the pixel of the right-eye image to correspond to positions of the user's left eye and right eye, respectively, and, based on the user location being changed, shifting the two left-eye sub pixels and the two right-eye sub pixels on a basis of one sub pixel according to the changed location.

\* \* \* \* \*